(12) United States Patent
Lee et al.

(10) Patent No.: US 12,145,666 B2
(45) Date of Patent: Nov. 19, 2024

(54) STEERING ASSIST DEVICE

(71) Applicant: HL MANDO CORPORATION, Pyeongtaek (KR)

(72) Inventors: Su-Min Lee, Siheung (KR); Kyu Yeong Je, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 286 days.

(21) Appl. No.: 17/719,382

(22) Filed: Apr. 13, 2022

(65) Prior Publication Data
US 2022/0371655 A1 Nov. 24, 2022

(30) Foreign Application Priority Data

May 24, 2021 (KR) .................. 10-2021-0065910

(51) Int. Cl.
*B62D 5/04* (2006.01)
*H02P 29/024* (2016.01)
*H02P 29/028* (2016.01)

(52) U.S. Cl.
CPC ........... *B62D 5/0487* (2013.01); *B62D 5/046* (2013.01); *B62D 5/0463* (2013.01);
(Continued)

(58) Field of Classification Search
CPC .... B62D 5/046; B62D 5/0463; B62D 5/0481; B62D 5/0484; B62D 5/0487; H02P 27/06;
(Continued)

(56) References Cited

U.S. PATENT DOCUMENTS

2009/0267551 A1* 10/2009 Shibata .................... H02P 6/24
318/400.21
2010/0060222 A1* 3/2010 Kezobo .................. G01R 31/52
318/490
(Continued)

FOREIGN PATENT DOCUMENTS

JP     2009261067 A  * 11/2009
JP     2013240171 A  * 11/2013
(Continued)

OTHER PUBLICATIONS

Office Action issued in Germany Patent Application No. 102022204928.4 dated Aug. 28, 2024.

*Primary Examiner* — John M Zaleskas
(74) *Attorney, Agent, or Firm* — Harvest IP Law, LLP

(57) ABSTRACT

A steering assist device may comprise an Ath power path controller positioned on an Ath power path connecting an Ath leg of an inverter with an Ath phase of a steering motor, a Bth power path controller positioned on a Bth power path connecting a Bth leg of the inverter with a Bth phase of the steering motor, a Cth power path controller positioned on a Cth power path connecting a Cth leg of the inverter with a Cth phase of the steering motor, and a controller unit determining a state of at least one of the Ath power path controller to the Cth power path controller based on at least one of an Ath phase voltage to a Cth phase voltage respectively formed at the Ath leg to the Cth leg of the inverter and controlling the steering motor according to a result of the determination.

16 Claims, 15 Drawing Sheets

(52) U.S. Cl.
CPC ........ *H02P 29/0243* (2016.02); *H02P 29/027* (2013.01); *H02P 29/028* (2013.01); *B62D 5/0481* (2013.01)

(58) Field of Classification Search
CPC ............. H02P 29/0241; H02P 29/0243; H02P 29/027; H02P 29/028
See application file for complete search history.

(56) References Cited

U.S. PATENT DOCUMENTS

| | | | | |
|---|---|---|---|---|
| 2011/0273122 | A1* | 11/2011 | Murata | H02P 29/0241 318/400.22 |
| 2012/0032625 | A1* | 2/2012 | Suzuki | B62D 5/0487 318/490 |
| 2012/0086373 | A1* | 4/2012 | Kudanowski | H02P 29/032 318/400.22 |
| 2013/0090809 | A1* | 4/2013 | Kuroda | B62D 5/0481 701/41 |
| 2013/0220726 | A1* | 8/2013 | Satou | H02P 29/0241 180/443 |
| 2013/0320895 | A1* | 12/2013 | Shibata | B62D 5/0484 318/400.22 |
| 2014/0055059 | A1* | 2/2014 | Uryu | H02P 27/06 318/9 |
| 2014/0139158 | A1* | 5/2014 | Tomita | H02P 29/0243 318/400.21 |
| 2014/0350788 | A1* | 11/2014 | Byun | B62D 5/0481 701/41 |
| 2014/0379204 | A1* | 12/2014 | Goto | G07C 5/0808 701/31.7 |
| 2015/0055258 | A1* | 2/2015 | Koeppl | H02H 7/0844 361/30 |
| 2015/0288304 | A1* | 10/2015 | Chappell | H02P 29/0241 318/400.21 |
| 2016/0325777 | A1* | 11/2016 | Mori | H02P 6/085 |
| 2016/0339949 | A1* | 11/2016 | Mori | H02P 29/032 |
| 2017/0033724 | A1* | 2/2017 | Kezobo | H02P 29/0241 |
| 2017/0033725 | A1* | 2/2017 | Koseki | H02P 25/22 |
| 2017/0201204 | A1* | 7/2017 | Kawano | B62D 5/0484 |
| 2017/0264221 | A1* | 9/2017 | Cash | B62D 5/0484 |
| 2017/0331399 | A1* | 11/2017 | Yamane | H02P 6/06 |
| 2018/0175779 | A1* | 6/2018 | Koseki | H02P 29/032 |
| 2018/0178830 | A1* | 6/2018 | Koseki | H02H 3/162 |
| 2019/0092382 | A1* | 3/2019 | Kogure | B62D 5/0409 |
| 2019/0241207 | A1* | 8/2019 | Jeong | B62D 15/021 |
| 2020/0028463 | A1* | 1/2020 | Suzuki | H02P 27/06 |
| 2020/0162009 | A1* | 5/2020 | Hatakeyama | F25B 31/02 |
| 2020/0186075 | A1* | 6/2020 | Koikegami | H02P 29/028 |
| 2020/0247464 | A1* | 8/2020 | Koikegami | H03K 17/0822 |
| 2020/0321902 | A1* | 10/2020 | Kozawa | B62D 5/0481 |
| 2021/0044245 | A1* | 2/2021 | Okubo | B62D 5/0463 |
| 2022/0014140 | A1* | 1/2022 | Singh | H02P 27/08 |
| 2022/0363308 | A1* | 11/2022 | Lee | B62D 5/0463 |
| 2024/0083493 | A1* | 3/2024 | Kimura | B62D 5/0421 |
| 2024/0088814 | A1* | 3/2024 | Tomizawa | H02P 27/06 |

FOREIGN PATENT DOCUMENTS

| | | | | |
|---|---|---|---|---|
| JP | 2017063571 | A * | 3/2017 | |
| JP | 2019009894 | A * | 1/2019 | ........... B62D 5/0484 |
| KR | 101303452 | B1 | 9/2013 | |
| KR | 20160060970 | A | 5/2016 | |
| KR | 20200022634 | A | 3/2020 | |
| KR | 20200077009 | A | 6/2020 | |
| WO | WO-2013030043 | A2 * | 3/2013 | ........... B62D 5/0481 |
| WO | 2019053992 | A1 | 3/2019 | |

* cited by examiner

STEERING ASSIST DEVICE

CROSS-REFERENCE TO RELATED APPLICATION

This application claims priority from Korean Patent Application No. 10-2021-0065910, filed on May 24, 2021, which is hereby incorporated by reference for all purposes as if fully set forth herein.

BACKGROUND

Field

The present embodiments relate to a steering assist device.

Description of Related Art

In general, steering system refers to a system in which the driver of a vehicle may change the steering angle of the wheels of a vehicle based on the steering force (or rotational force) applied to the steering wheel. Electromotive power steering systems, e.g., electric power steer (EPS), have been recently applied to vehicles to ensure stable steering by reducing the steering force of the steering wheel.

The requirement for reliability and safety is recently increasing for vehicle steering systems. Also increasing is the demand for research and development for safety of the power source device of the steering motor in the steering system of the autonomous vehicle.

BRIEF SUMMARY

According to the present embodiments, it is possible to provide a steering assist device capable of increasing reliability by securing the safety of the power source device of the steering motor.

In an aspect, the present embodiments may provide a steering assist device comprising an Ath power path controller positioned on an Ath power path connecting an Ath leg of an inverter with an Ath phase of a steering motor, a Bth power path controller positioned on a Bth power path connecting a Bth leg of the inverter with a Bth phase of the steering motor, a Cth power path controller positioned on a Cth power path connecting a Cth leg of the inverter with a Cth phase of the steering motor, and a controller unit controlling an operation of the inverter and the Ath power path controller to the Cth power path controller, determining a state of at least one of the Ath power path controller to the Cth power path controller based on at least one of an Ath phase voltage to a Cth phase voltage respectively formed at the Ath leg to the Cth leg of the inverter through the operation, and controlling the steering motor according to a result of the determination.

According to the present embodiments, it is possible to provide a steering assist device capable of increasing reliability by securing the safety of the power source device of the steering motor.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
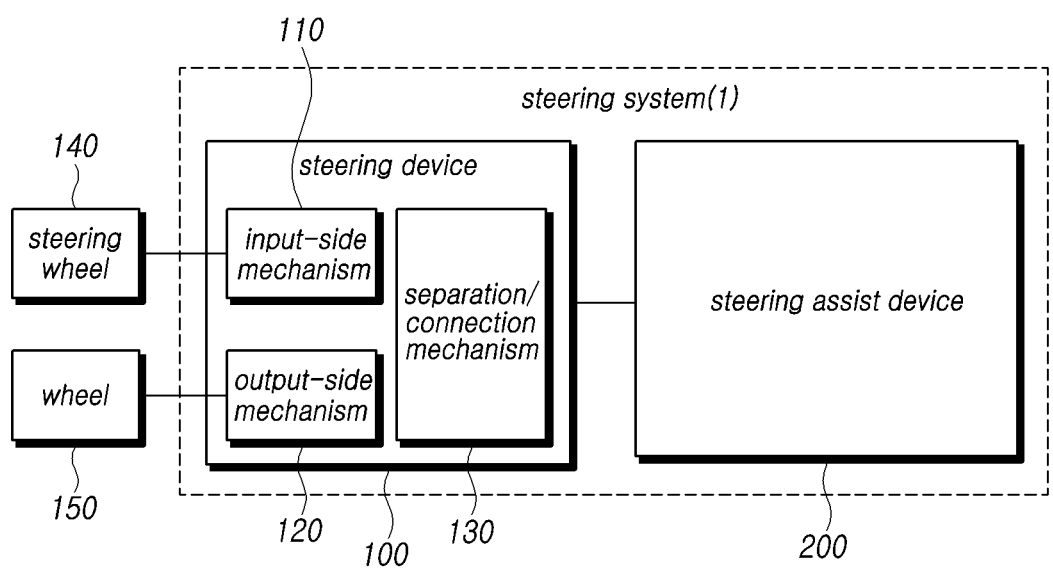
FIG. 1 is a block diagram illustrating a configuration of a steering system according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a configuration of a steering system according to the present embodiments;

Referring to FIG. 1, according to the present embodiments, a steering system 1 may include at least one of a steering device 100 or a steering assist device 200.

The steering device 100 and the steering assist device 200 may be connected by at least one of an electrical, magnetic, or mechanical connection.

The steering device 100 may change the steering angle of a wheel 150 based on a steering force (or rotational force) applied to the steering wheel 140.

The steering device 100 may include at least one of an input-side mechanism 110, an output-side mechanism 120, or a separation/connection mechanism 130.

The input-side mechanism 110, the output-side mechanism 120, and the separation/connection mechanism 130 may be connected by at least one of an electrical, magnetic, or mechanical connection.

The input-side mechanism 110 may be connected to the steering wheel 140. The input-side mechanism 110 may rotate in a rotational direction of the steering wheel 140 or in a direction opposite to the rotational direction of the steering wheel 140.

The output-side mechanism 120 may be connected with the input-side mechanism 110. For example, the output-side mechanism 120 may be connected to the input-side mechanism 110 by at least one of an electrical or mechanical connection.

The output-side mechanism 120 may be connected with the wheel 150. The output-side mechanism 120 may change the steering angle (or movement) of the wheel 150.

The separation/connection mechanism 130 may be connected to the input-side mechanism 110 and the output-side mechanism 120. The separation/connection mechanism 130 may mechanically and/or electrically connect and/or separate the input-side mechanism 110 and the output-side mechanism 120.

The separation/connection mechanism 130 may include a clutch but, without limitations thereto, may include any mechanism (or device) that may connect and/or separate the input-side mechanism and the output-side mechanism.

The steering assist device 200 may be connected with the steering device 100. The steering assist device 200 may assist the steering device 100.

The steering wheel 140 may be connected with the input-side mechanism 110. The steering wheel 140 may rotate the input-side mechanism 110.

The wheel 150 may be connected with the output-side mechanism 120. The wheel 150 may change the steering angle (or movement) by the output-side mechanism 120.

The steering wheel 140 and the wheel 150 may not be included in the steering device 100 as illustrated in the drawings but, without limitations thereto, may be included in the steering device 100.

According to the present embodiments, the steering device may include at least one of a steering device in which an input-side mechanism and an output-side mechanism are connected mechanically, a steering device (e.g., steer by wire (SbW)) in which an input-side mechanism and an output-side mechanism are connected electrically, or a steering device (e.g., an SbW including a clutch) in which an input-side mechanism and an output-side mechanism are connected with a separation/connection mechanism.

Figure 2:
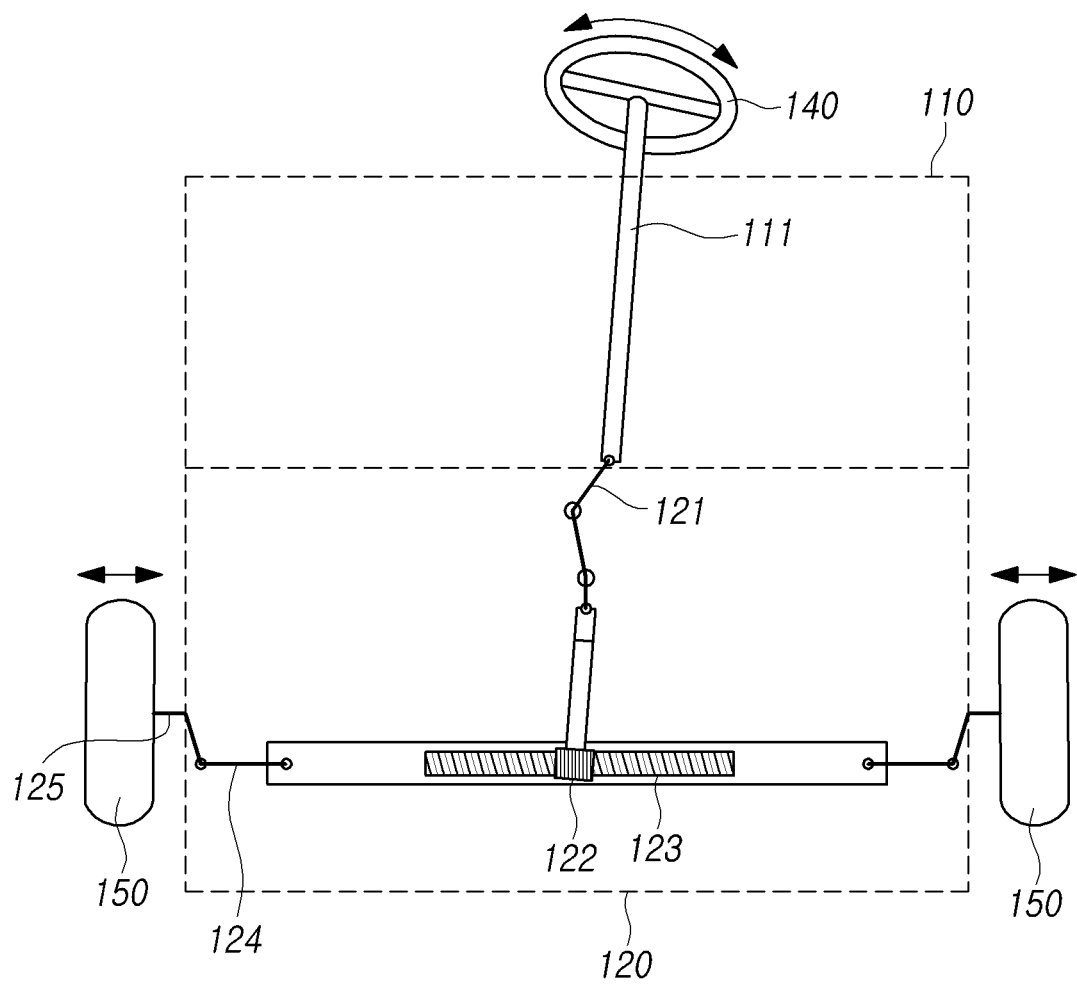
FIGS. 2 and 3 are views illustrating a steering device according to the present embodiments.
Figure 3:
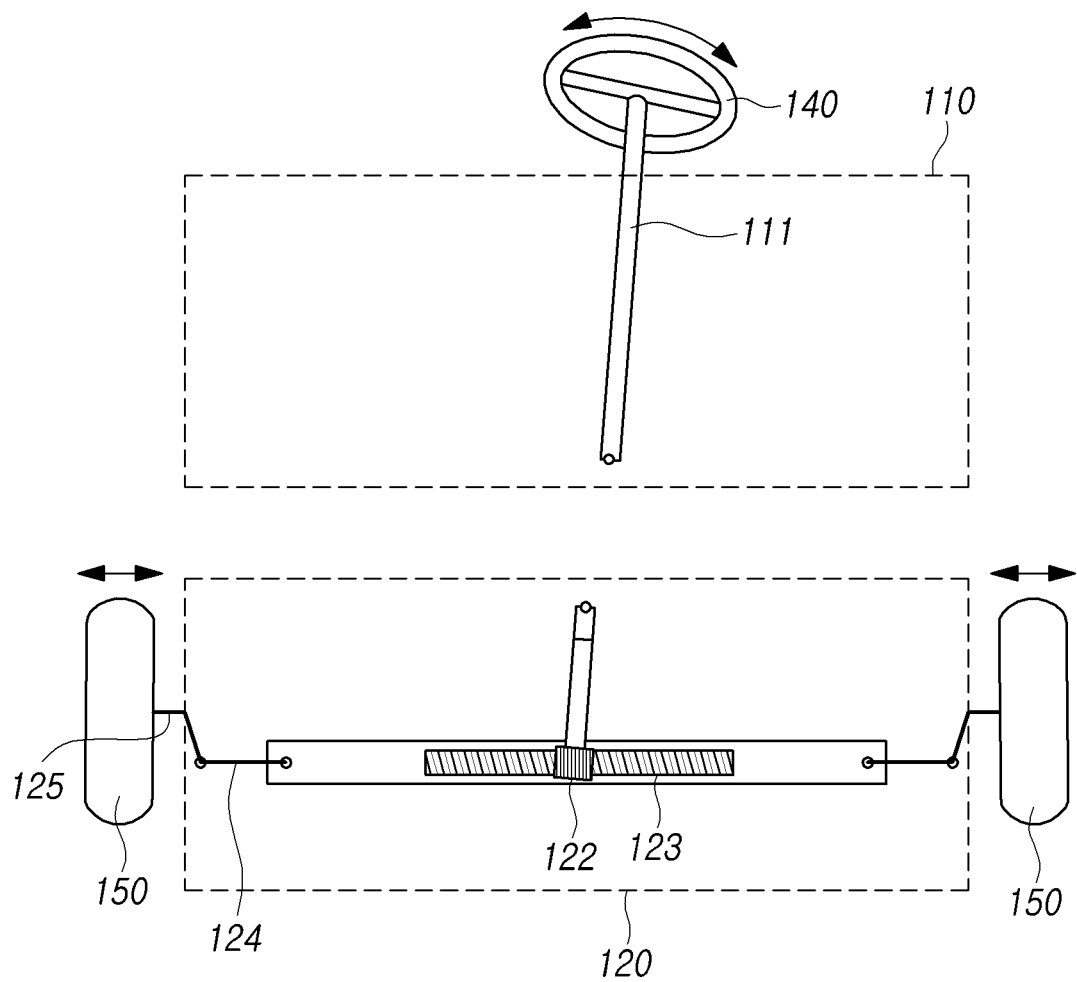

FIGS. 2 and 3 are views illustrating a steering device according to the present embodiments.

Referring to FIG. 2, according to the present embodiments, a steering device 100 may include a steering device in a form in which an input-side mechanism 110 and an output-side mechanism 120 are mechanically connected.

In other words, according to the present embodiments, the steering device 100 may include at least one of the input-side mechanism 110 connected with the steering wheel 140 or the output-side mechanism 120 mechanically connected with the input-side mechanism 110 and connected with the wheel 150.

The input-side mechanism 110 may include a steering shaft 111 connected to the steering wheel 140 but, without limitations thereto, may include any mechanism (or device) that may rotate in the rotational direction of the steering wheel or in the direction opposite to the rotational direction of the steering wheel.

The output-side mechanism 120 may include at least one of a universal joint 121, a pinion 122, a rack 123, a tie rod 124, or a knuckle arm 125 but, without limitations thereto, may include any mechanism (or device) that may change the steering angle (or movement) of the wheel.

Referring to FIG. 3, according to the present embodiments, a steering device 100 may include a steering device in a form in which an input-side mechanism 110 and an output-side mechanism 120 are electrically connected. In other words, according to the present embodiments, the steering device 100 may include a steer by wire (SbW) steering device.

In other words, according to the present embodiments, the steering device 100 may include at least one of the input-side mechanism 110 connected with the steering wheel 140 or the output-side mechanism 120 mechanically separated from the input-side mechanism 110 and connected with the wheel 150.

The input-side mechanism 110 may include a steering shaft 111 connected to the steering wheel 140 but, without limitations thereto, may include any mechanism (or device) that may rotate in the rotational direction of the steering wheel or in the direction opposite to the rotational direction of the steering wheel.

The output-side mechanism 120 may include at least one of a pinion 122, a rack 123, a tie rod 124, or a knuckle arm 125 but, without limitations thereto, may include any mechanism (or device) that may change the steering angle (or movement) of the wheel.

Meanwhile, according to the present embodiments, the steering device 100 may include a steering device in a form in which the input-side mechanism 110 and the output-side mechanism 120 are connected with the separation/connection mechanism 130. In other words, according to the present embodiments, the steering device 100 may include a steer by wire (SbW) steering device including a clutch.

In other words, according to the present embodiments, the steering device 100 may include at least one of the input-side mechanism 110 connected with the steering wheel 140, the output-side mechanism 120 mechanically separated from the input-side mechanism 110 and connected with the wheel 150, or the separation/connection mechanism 130 mechanically and/or electrically connecting and/or separating the input-side mechanism 110 and the output-side mechanism 120.

Figure 4:
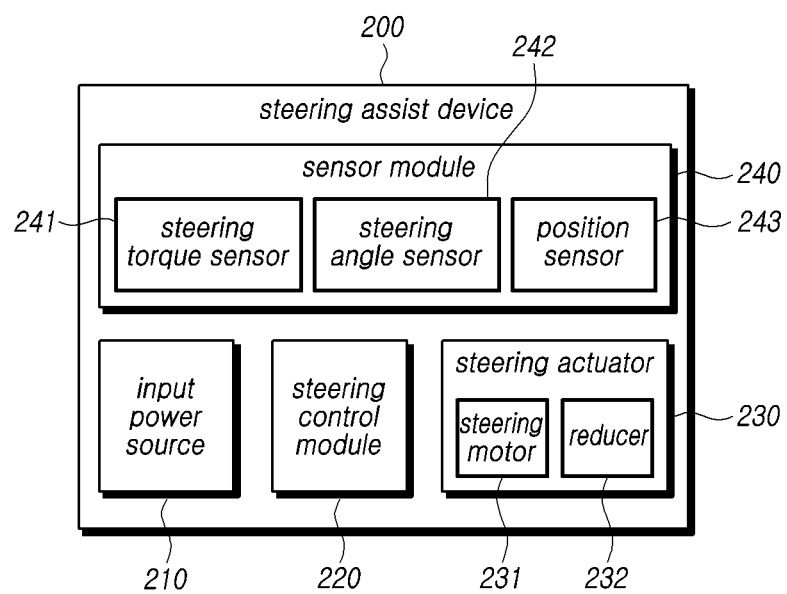
FIG. 4 is a block diagram illustrating a configuration of a steering assist device according to the present embodiments.

FIG. 4 is a block diagram illustrating a configuration of a steering assist device according to the present embodiments.

Referring to FIG. 4, according to the present embodiments, a steering assist device 200 may be connected with at least one of the input-side mechanism 110, the output-side mechanism 120, or the separation/connection mechanism 130. The steering assist device 200 may assist and/or control at least one of the input-side mechanism 110, the output-side mechanism 120, or the separation/connection mechanism 130.

For example, the steering assist device 200 may provide an assist steering force to at least one of the input-side mechanism 110 or the output-side mechanism 120. Further, the steering assist device 200 may control the separation/connection mechanism 130 and, based thereupon, provide an assist steering force to at least one of the input-side mechanism 110 or the output-side mechanism 120.

The steering assist device 200 may include at least one of an input power source 210, a steering control module 220, a steering actuator 230, or a sensor module 240.

The input power source 210, the steering control module 220, the steering actuator 230, and the sensor module 240 may be connected by at least one of an electrical, magnetic, or mechanical connection. There may be provided one or more input power sources 210, one or more steering control modules 220, one or more steering actuators 230, and one or more sensor modules 240.

The input power source 210 may include at least one of a direct current (DC) power source or an alternating current (AC) power source. The DC power source may include a battery but, without limitations thereto, may include any power source may provide DC power.

The steering control module 220 may control the operation of at least one of the input power source 210, the steering actuator 230, or the sensor module 240.

For example, the steering control module 220 may be connected with the input power source 210. The steering control module 220 may receive electric energy from the input power source 210 and filter noise included in the electric energy.

Here, the electric energy may include at least one of current, voltage, or power but, without limitations thereto, the electric energy may include any energy related to electricity.

The steering control module 220 may generate a steering motor control signal based on information (e.g., at least one of the steering torque information, steering angle information, position information, or vehicle speed information) received from each component in the steering system 1 and/or the vehicle.

The steering control module 220 may convert the filtered electric energy according to the steering motor control signal to thereby generate an assist steering force and control the steering actuator 230 (or steering motor 231) based on the assist steering force.

The steering actuator 230 may be connected with the steering control module 220. The steering actuator 230 may operate based on the assist steering force provided from the steering control module 220, assisting the steering device 100 in steering.

The steering actuator 230 may include at least one of a steering motor 231 or a reducer 232 but, without limitations thereto, the steering actuator 230 may include any mechanism (or device) that may assist the steering device in steering.

There may be provided one or more steering motors 231 or one or more reducers 232. At least one of the steering motor 231 or the reducer 232 may be connected with the steering control module 220.

If the steering actuator 230 includes the steering motor 231, the steering motor 231 may operate based on the assist steering force provided from the steering control module 220, assisting the steering device 100 in steering.

If the steering actuator 230 includes the steering motor 231 and the reducer 232, the steering motor 231 may operate based on the assist steering force provided from the steering control module 220, and the reducer 232 may operate according to the operation of the steering motor 231 to thereby assisting the steering device 100 in steering.

The steering motor 231 may include at least one of a single winding-type steering motor or a dual winding-type steering motor but, without limitations thereto, may include any motor that may assist the steering device in steering.

The steering motor 231 may include at least one of a single-phase type motor, a three-phase type motor, or a five-phase type motor but, without limitations thereto, may include any motor that may assist the steering device in steering.

The steering motor 231 may include at least one of a DC motor or an AC motor (e.g., a synchronous motor and/or an induction motor) but, without limitations thereto, may include any motor that may assist the steering device in steering.

The sensor module 240 may include at least one sensor. Here, the sensor may include at least one of a steering torque sensor 241, a steering angle sensor 242, or a position sensor 243 but, without limitations thereto, may include any sensor capable of measuring the state of the vehicle and the steering state of the vehicle.

There may be provided one or more steering torque sensors 241. The steering torque sensor 241 may measure the steering torque of the steering wheel to obtain steering torque information about the steering wheel, and provide the steering torque information about the steering wheel to the steering control module 220.

There may be provided one or more steering angle sensors 242. The steering angle sensor 242 may measure the steering angle of the steering wheel to obtain steering angle information about the steering wheel, and provide the steering angle information about the steering wheel to the steering control module 220.

There may be provided one or more position sensors 243. The position sensor 243 may measure at least one of the position of the input-side mechanism, the position of the output-side mechanism, or the position of the steering motor to thereby obtain at least one of position information about the input-side mechanism, position information about the output-side mechanism, or position information about the steering motor and may provide at least one of the position information about the input-side mechanism, the position information about the output-side mechanism, or the position information about the steering motor to the steering control module 220.

The steering torque sensor 241, the steering angle sensor 242, and the position sensor 243 may be included in the sensor module as illustrated in the drawings but, without limitations thereto, may be included in at least one of the input-side mechanism 110, the output-side mechanism 120, the separation/connection mechanism 130, the steering wheel 140, the wheel 150, the input power source 210, the steering control module 220, or the steering actuator 230 (steering motor 231 or reducer 232) or may be separately positioned.

Figure 5:
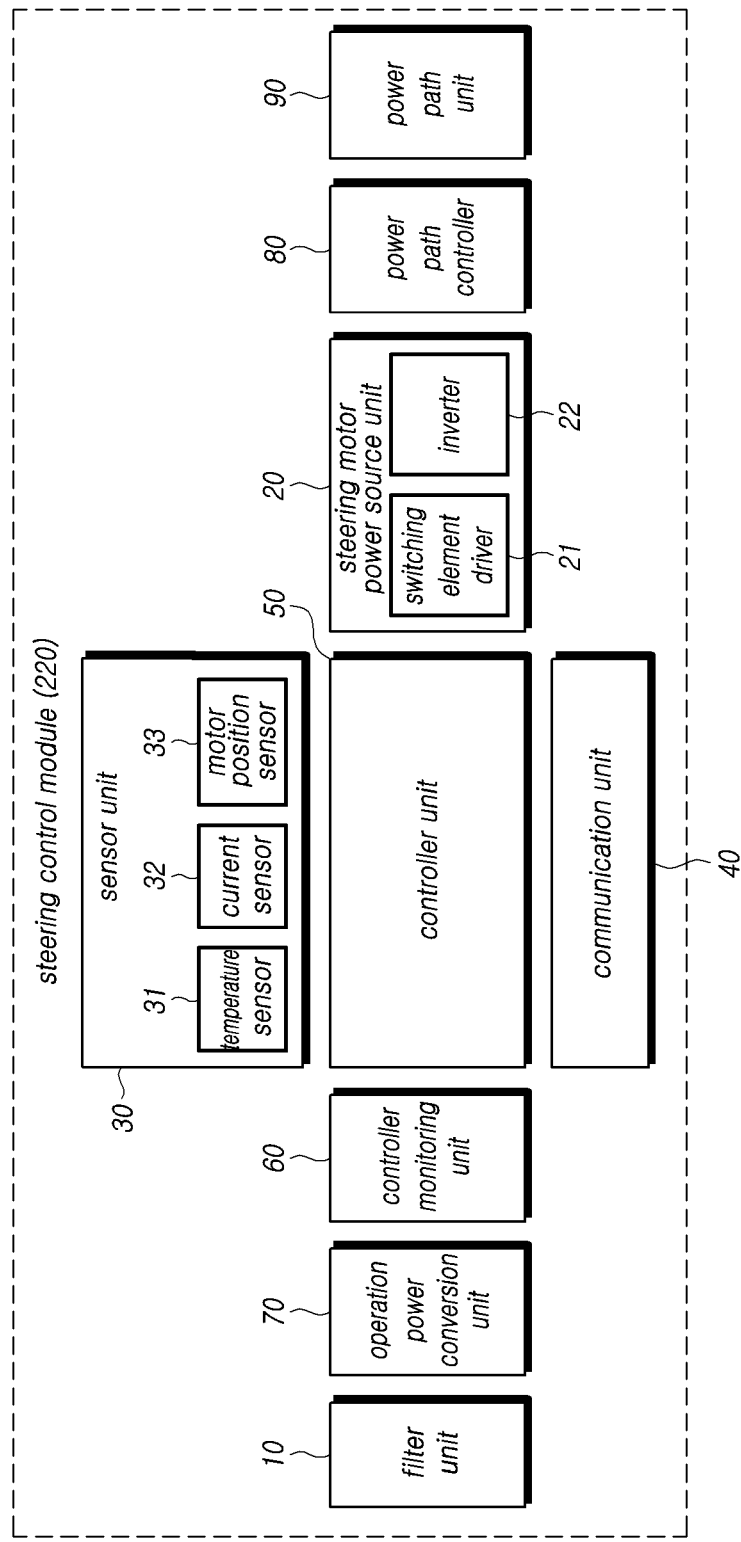
FIGS. 5, 6, and 7 are block diagrams illustrating a configuration of a steering control module according to the present embodiments.
Figure 6:
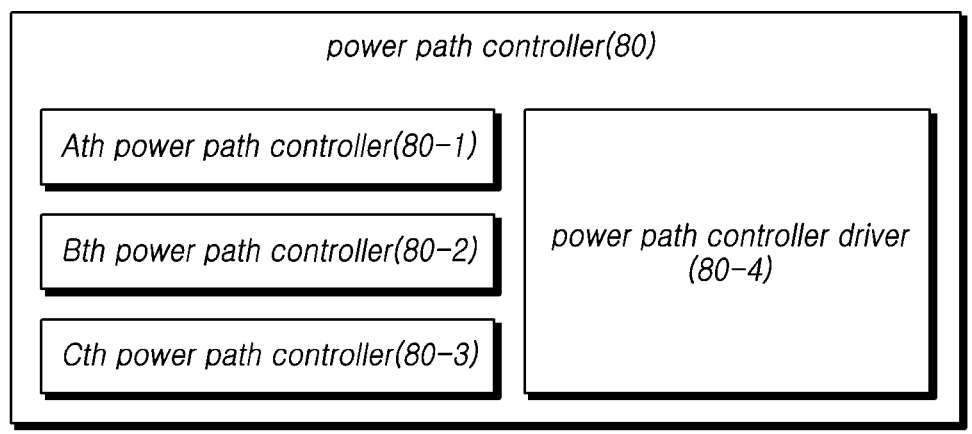
Figure 7:
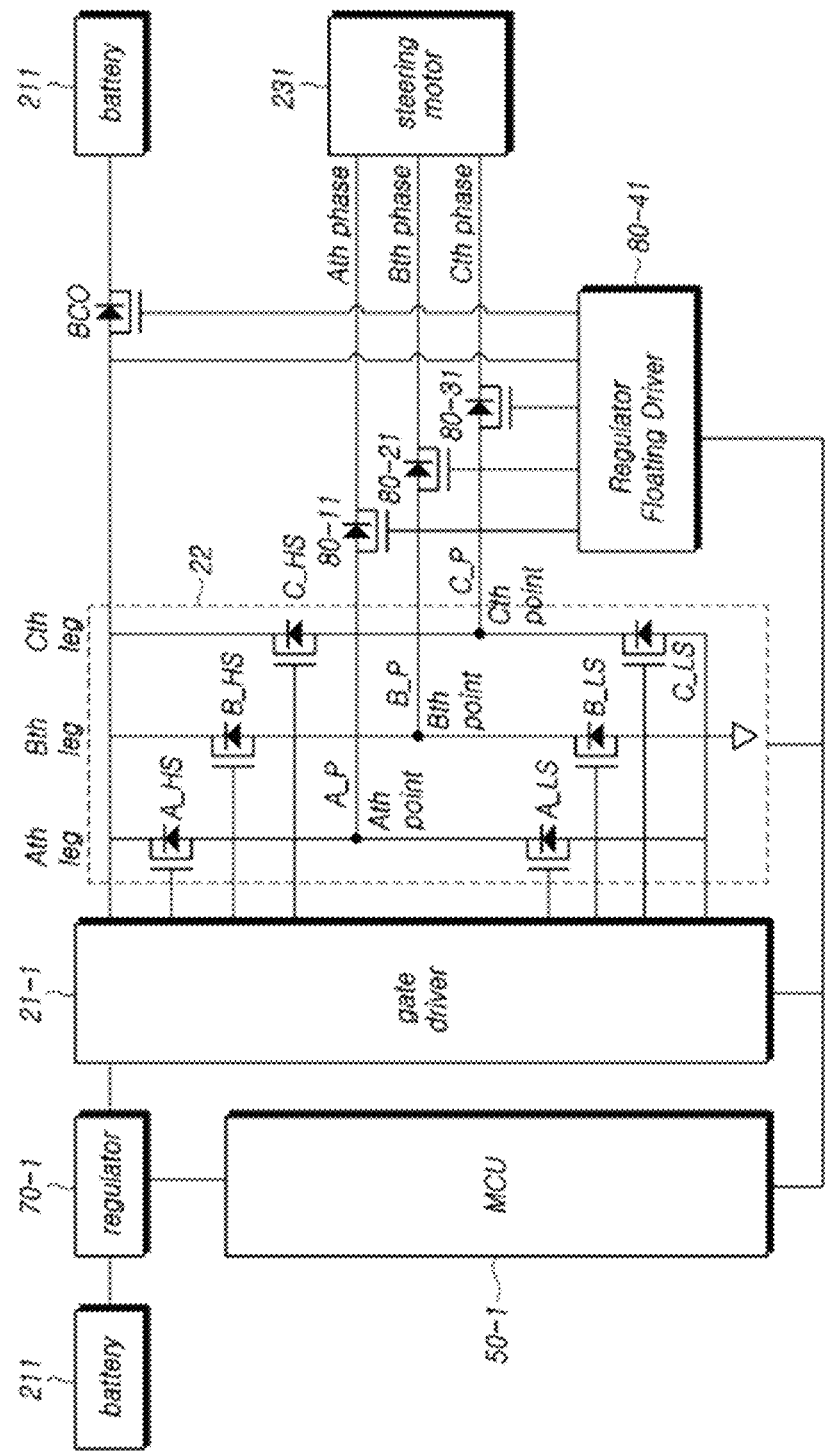

FIGS. 5, 6, and 7 are block diagrams illustrating a configuration of a steering control module according to the present embodiments.

Referring to FIG. 5, according to the present embodiments, the steering control module 220 may include at least one of a filter unit 10, a steering motor power source unit 20, a sensor unit 30, a communication unit 40, a controller unit 50, a controller monitoring unit 60, an operation power conversion unit 70, or a power path controller 80.

The filter unit 10, the steering motor power source unit 20, the sensor unit 30, the communication unit 40, the controller unit 50, the controller monitoring unit 60, the operation power conversion unit 70, and the power path controller 80 may be connected by at least one of an electrical, magnetic, or mechanical connection.

There may be provided one or more filter units 10. The filter unit 10 may be connected to the input power source 210. The filter unit 10 may filter noise included in electric energy provided from the input power source 210 and provide the filtered electric energy to the steering motor power source unit 20 and the operation power conversion unit 70.

There may be provided one or more steering motor power source units 20. The steering motor power source unit 20 may be connected with the filter unit 10 and may receive filtered electric energy from the filter unit 10.

The steering motor power source unit 20 may be connected with the controller unit 50 and may receive a steering motor control signal from the controller unit 50. The steering motor power source unit 20 may generate an assist steering force by converting the filtered electric energy based on the steering motor control signal, and control the steering motor 231 based on the assist steering force.

The steering motor power source unit 20 may include at least one of a switching element driver 21 or an inverter 22.

The switching element driver 21 and the inverter 22 may be connected by at least one of an electrical, magnetic, or mechanical connection. There may be provided one or more switching element drivers 21 or one or more inverters 22.

The switching element driver 21 may receive the steering motor control signal from the controller unit 50, generate a switching element control signal based on the steering motor control signal, and provide the switching element control signal to the inverter 22.

The inverter 22 may convert the filtered electric energy of the filter unit 10 according to the switching element control signal, generating an assist steering force.

The inverter 22 may include a switch and/or a transistor but, without limitations thereto, may include any element (or device) that may generate an assist steering force by converting the electric energy according to the switching element control signal.

If the inverter 22 includes a field effect transistor (FET), the switching element driver 21 may be a gate driver. Accordingly, the gate driver may receive the steering motor control signal from the controller unit 50, generate a gate control signal based on the steering motor control signal, and provide the gate control signal to the inverter 22. The inverter 22 may convert the filtered electric energy of the filter unit according to the gate control signal, generating an assist steering force.

There may be provided one or more power path controllers 80. The power path controller 80 may be positioned between the steering motor power source unit 20 and the steering actuator 230, supplying or cutting off the supply of the assist steering force received from the steering motor power source unit 20 to the steering actuator 230.

Specifically, the power path controller 80 may be positioned between the inverter 22 and the steering motor 231, supplying or cutting off the supply of the assist steering force received from the inverter 22 to the steering motor 231.

The power path controller 80 may include at least one phase disconnector (PCO). The phase disconnector is an element or circuit capable of cutting off a phase, and may include at least one of a switch, a circuit breaker, a disconnecting switch, or a transistor but, without limitations thereto, may include any element or circuit that may cut off a phase.

There may be provided one or more power path units 90. The power path unit 90 may be positioned between the steering motor power source unit 20 and the steering actuator 230 to connect them, thereby providing a power path for flowing the assist steering force from the steering motor power unit 20 to the steering actuator 230.

Specifically, the power path unit 90 may be positioned between the inverter 22 and the steering motor 231 to connect them, thereby providing a power path for flowing the assist steering force from the inverter 22 to the steering motor 231.

Meanwhile, the power path controller 80 may be positioned on the power path unit 90. Thus, the power path controller 80 may control the power path of the power path unit 90, supplying or cutting off the supply of the assist steering force received from the steering motor power source unit 20 (or inverter 22) to the steering actuator 230 (or steering motor 231).

The sensor unit 30 may include at least one of a temperature sensor 31, a current sensor 32, or a motor position sensor 33 but, without limitations thereto, may include any sensor that may measure the state of the steering system (or the steering control module).

There may be provided one or more temperature sensors 31, one or more current sensors 32, or one or more motor position sensors 33.

The temperature sensor 31 may measure the temperature of the steering control module 220 to thereby obtain temperature information, and provide the temperature information to the controller unit 50.

The current sensor 32 may measure the assist current (or assist steering force) provided from the steering motor power source unit 20 to the steering actuator 230 (or the steering motor 231) to thereby obtain assist current information, and provide the assist current information to the controller unit 50.

The motor position sensor 33 may measure the position of the steering motor to obtain position information about the steering motor and may provide the position information about the steering motor to the controller unit 50. The motor position sensor 33 may be included in the steering control module 220 but, without being limited thereto, the motor position sensor 33 may be separately provided.

There may be provided one or more communication units 40. The communication unit 40 may include at least one of an internal communication unit or an external communication unit. When there are a plurality of steering control modules, the internal communication unit may be connected with other steering control modules to receive or provide information. The external communication unit may be connected with the vehicle to receive vehicle state information (e.g., vehicle speed information) from the vehicle or provide information related to the steering system to the vehicle.

There may be provided one or more controller units 50. The controller unit 50 may be connected with each component of the steering control module 220 to provide or receive information and, based thereupon, control the operation for each component of the steering control module 220.

For example, the controller unit 50 may generate a steering motor control signal based on at least one of the steering torque information about the steering wheel, steering angle information about the steering wheel, temperature information, assist current information, position information (position information about the input-side mechanism, position information about the output-side mechanism, and position information about the steering motor), vehicle state information (e.g., vehicle speed information), state information about the input power source, short circuit (or overcurrent) state information, current sensing information about the filter unit, or state information about the steering motor, and provide the steering motor control signal to the steering motor power source unit 20 (or switching element driver 21), or may generate a separation/connection control signal (e.g., a clutch control signal) and provide the separation/connection control signal to the separation/connection mechanism.

The controller unit 50 may include a microcontroller but, without limitations thereto, may include any device (or computer) that may process (or execute or compute) programs.

The controller monitoring unit 60 may be connected with the controller unit 50. The controller monitoring unit 60 may monitor the operating state of the controller unit 50. For example, the controller unit 50 may provide a watchdog signal to the controller monitoring unit 60. The controller monitoring unit 60 may be cleared based on the watchdog signal received from the controller unit 50 or may generate a reset signal and provide the reset signal to the controller unit 50.

The controller monitoring unit 60 may include a watchdog but, without limitations thereto, may include any device capable of monitoring the controller unit. In particular, a watchdog may include a window watchdog having a deadline, that is, a start and an end.

The operation power conversion unit 70 may be connected with the filter unit 10. The operation power conversion unit 70 may generate an operating voltage for each component of the steering control module 220 by converting the filtered electric energy of the filter unit 10.

The operation power conversion unit 70 may include at least one of a DC-DC converter or a regulator but, without limitations thereto, may include any device that may convert the filtered electric energy to thereby generate an operating voltage for each component of the steering control module and/or for the outside of the steering control module.

The steering control module 220 may include an electronic control unit (ECU) but, without limitations thereto, may include any controller (or system) that may perform electronic control.

The steering actuator 230 may be positioned on any one of the input-side mechanism 110 and the output-side mechanism 120 to assist them.

For example, if the steering actuator 230 is positioned on the steering shaft 111 of the input-side mechanism 110, the steering system according to the present embodiments may be of a C-EPS type and, if the steering actuator 230 is positioned on the rack 123 of the output-side mechanism 120, the steering system according to the present embodiments may be of an R-EPS type. If the steering actuator 230 is positioned on the pinion 122 of the output-side mechanism 120, the steering system according to the present embodiments may be of a P-EPS type.

There may be provided one or more steering assist devices 200.

For example, if two steering assist devices 200 are provided, the steering assist devices 200 may include an input-side steering assist device and an output-side steering assist device.

The input-side steering assist device may be connected with the input-side mechanism by at least one of electrical, magnetic or mechanical connection. The input-side steering assist device may assist the input-side mechanism.

The output-side steering assist device may be connected with the output-side mechanism by at least one of electrical, magnetic or mechanical connection. The output-side steering assist device may assist the output-side mechanism.

Since each of the input-side steering assist device and the output-side steering assist device may be understood as the same component as the above-described steering assist device, it may perform all of the above-described functions of the steering assist device and may include all of the components of the steering assist device.

For example, the input-side steering assist device may include at least one of an input-side input power source, an input-side steering control module, an input-side steering actuator, or an input-side sensor module. The input-side input power source may include at least one of an input-side direct current (DC) power source or an input-side alternating current (AC) power source. The input-side steering control module may include at least one of an input-side filter unit, an input-side steering motor power source unit, an input-side sensor unit, an input-side communication unit, an input-side controller unit, an input-side controller monitoring unit, an input-side operation power conversion unit, or an input-side power path controller. The input-side steering motor power source unit may include at least one of an input-side switching element driver or an input-side inverter. The input-side sensor unit may include at least one of an input-side temperature sensor, an input-side current sensor, or an input-side motor position sensor. The input-side steering actuator may include at least one of an input-side steering motor or an input-side reducer. The input-side sensor module may include at least one of an input-side steering torque sensor, an input-side steering angle sensor, or an input-side position sensor.

For example, the output-side steering assist device may include at least one of an output-side input power source, an output-side steering control module, an output-side steering actuator, or an output-side sensor module. The output-side input power source may include at least one of an output-side direct current (DC) power source or an output-side alternating current (AC) power source. The output-side steering control module may include at least one of an output-side filter unit, an output-side steering motor power source unit, an output-side sensor unit, an output-side communication unit, an output-side controller unit, an output-side controller monitoring unit, an output-side operation power conversion unit, or an output-side power path controller. The output-side steering motor power source unit may include at least one of an output-side switching element driver or an output-side inverter. The output-side sensor unit may include at least one of an output-side temperature sensor, an output-side current sensor, or an output-side motor position sensor. The output-side steering actuator may include at least one of an output-side steering motor or an output-side reducer. The output-side sensor module may include at least one of an output-side steering torque sensor, an output-side steering angle sensor, or an output-side position sensor.

The input-side sensor module may include at least one of a steering torque sensor, a steering angle sensor, or an input-side position sensor, and the output-side sensor module may include an output-side position sensor.

The input-side input power source and the output-side input power source may be formed as a single unit.

Each of all of the components included in each of the steering assist device, the input-side steering assist device, and the output-side steering assist device may be configured in duplicate.

Referring to FIG. 6, according to the present embodiments, a power path controller 80 may include at least one of an Ath power path controller 80-1, a Bth power path controller 80-2, a Cth power path controller 80-3, or a power path controller driver 80-4. Throughout the specification, the terms, "Ath", "Bth", and "Cth" are used to describe three elements, which are similar to one another in terms of their structure and function, but are distinguished from one another in terms of counting. In other words, "Ath", "Bth", "Cth" may be understood as indicating a same meaning as the terms "1st", "2nd", "3rd", or "(A)", "(B)", "(C)". For example, "Ath power path controller 80-1", "Bth power path controller 80-2", and "Cth power path controller 80-3" may be interpreted as a power path controller 80-1 (the first one), a power path controller 80-2 (the second one), a power path controller 80-3 (the third one), similar to one another in terms of their structure and function, but distinguished from one another in terms of counting.

The Ath power path controller 80-1, the Bth power path controller 80-2, the Cth power path controller 80-3, and the power path controller driver 80-4 may be connected by at least one of electrical, magnetic, or mechanical connection.

The Ath power path controller 80-1, the Bth power path controller 80-2, and the Cth power path controller 80-3 may supply, or cut off the supply of, an assist steering force (e.g., an assist current) generated through an inverter, to the steering motor based on a power path control signal and/or a gate power path control signal.

The power path controller driver 80-4 may convert the power path control signal into a gate power path control signal and provide the gate power path control signal to the power path controller. The power path controller driver 80-4 may perform all of the functions performed by the above-described gate driver. In other words, the power path controller driver 80-4 and the gate driver may be elements performing the same function.

The power path controller driver 80-4 may include, but is not limited to, a regulator floating driver 80-41 and may include any element capable of converting a power path control signal into a gate power path control signal.

Referring to FIG. 7, the input power source 210 may include a battery 211. The battery may provide a direct-current (DC) voltage.

The operation power conversion unit 70 may include a regulator 70-1. The regulator 70-1 may convert the DC voltage of the battery 211 to generate an operating voltage for each component of the steering assist device.

The controller unit 50 may include a microcontroller (MCU) 50-1. The MCU 50-1 may generate a steering motor control signal and a power path control signal.

The switching device driver 21 may include a gate driver 21-1. The gate driver 21-1 may convert the steering motor control signal into a gate control signal and provide the gate control signal to the inverter.

The inverter 22 may convert the electric energy received from the battery 211 based on the steering motor control signal and/or the gate control signal to generate an assist steering force (e.g., assist current).

The power path unit 90 may include an Ath power path A_P, a Bth power path B_P, and a Cth power path C_P. The Ath power path A_P, the Bth power path B_P, and the Cth power path C_P may connect the inverter 22 with the steering motor 231 and may provide the assist steering force (e.g., assist current) generated through the inverter 22 to the steering motor 231.

The Ath power path controller 80-1 may include an Ath power path switching element 80-11, but without limitations thereto, may include any element capable of connecting or disconnecting the Ath power path.

The Bth power path controller 80-2 may include a Bth power path switching element 80-21, but without limitations thereto, may include any element capable of connecting or disconnecting the Bth power path.

The Cth power path controller 80-3 may include a Cth power path switching element 80-31, but without limitations thereto, may include any element capable of connecting or disconnecting the Cth power path.

The power path controller driver 80-4 may include, but is not limited to, a regulator floating driver 80-41 and may include any element capable of converting a power path control signal into a gate power path control signal.

Referring to FIGS. 1 to 7, according to the present embodiments, the steering assist device may include the Ath power path controller 80-1 positioned on an Ath power path A_P connecting an Ath leg of the inverter with an Ath phase of the steering motor, the Bth power path controller 80-2 positioned on a Bth power path B_P connecting a Bth leg of the inverter with a Bth phase of the steering motor, and the Cth power path controller 80-3 positioned on a Cth power path C_P connecting a Cth leg of the inverter with a Cth phase of the steering motor, and a controller unit 50 controlling the operation of the inverter and the Ath power path controller 80-1 to the Cth power path controller 80-3 and, based thereupon, determining the state of at least one power path controller of the Ath power path controller 80-1 to the Cth power path controller 80-3 based on at least one phase voltage of the Ath phase voltage to the Cth phase voltage respectively formed at the Ath leg to Cth leg of the inverter, and controlling the steering motor 231 according to a result of the determination.

Specifically, the Ath power path controller 80-1 may be positioned on the Ath power path A_P. The Ath power path A_P may connect the Ath leg of the inverter with the Ath phase of the steering motor.

The Ath power path controller 80-1 may supply, or cut off the supply of, an Ath assist steering force (e.g., an Ath assist current) flowing through the Ath power path A_P, i.e., the Ath assist steering force received from the steering motor power source unit 20 (or the inverter 22), to the steering actuator 230 (or the steering motor 231).

The Bth power path controller 80-2 may be positioned on the Bth power path B_P. The Bth power path B_P may connect the Bth leg of the inverter with the Bth phase of the steering motor.

The Bth power path controller 80-2 may supply, or cut off the supply of, a Bth assist steering force (e.g., a Bth assist current) flowing through the Bth power path B_P, i.e., the Bth assist steering force received from the steering motor power source unit 20 (or the inverter 22), to the steering actuator 230 (or the steering motor 231).

The Cth power path controller 80-3 may be positioned on the Cth power path C_P. The Cth power path C_P may connect the Cth leg of the inverter with the Cth phase of the steering motor.

The Cth power path controller 80-3 may supply, or cut off the supply of, a Cth assist steering force (e.g., a Cth assist current) flowing through the Cth power path C_P, i.e., the Cth assist steering force received from the steering motor power source unit 20 (or the inverter 22), to the steering actuator 230 (or the steering motor 231).

The controller unit 50 may control the operation of the inverter and the Ath power path controller 80-1 to the Cth power path controller 80-3.

The controller unit 50 may determine the state of at least one power path controller of the Ath power path controller 80-1 to the Cth power path controller 80-3 based on at least one phase voltage of the Ath phase voltage to the Cth phase voltage respectively formed at the Ath leg to Cth leg of the inverter through the operation of the inverter and the Ath power path controller 80-1 to the Cth power path controller 80-3.

The controller unit 50 may control the steering motor (or steering assist) according to a result of the determination of the state of at least one power path controller.

The power path controller may include at least one state of a short state, an open state, or a normal state, but without limitations thereto, may include any state that may indicate the state of the power path controller.

If the state of the power path controller is the short state and/or the open state, the controller unit 50 may perform at least one of controlling the steering motor as an emergency, stopping the control of the steering motor and controlling to allow steering to be operated in a passive state (or manually), or controlling a notification device to generate a notification.

According to the present embodiments, the steering assist device may include at least one of an inverter or a power path unit.

The inverter 22 may include an Ath leg, a Bth leg, and a Cth leg.

The Ath leg may include an Ath high-side switching element A_HS and an Ath low-side switching element A_LS connected in series with each other.

The Bth leg may include a Bth high-side switching element B_HS and a Bth low-side switching element B_LS connected in series with each other.

The Cth leg may include a Cth high-side switching element C_HS and a Cth low-side switching element C_LS connected in series with each other.

The power path unit 90 may include an Ath power path A_P, a Bth power path B_P, and a Cth power path C_P.

The Ath power path A_P may connect an Ath point positioned in the Ath leg with the Ath phase of the steering motor. The Ath point positioned in the Ath leg may be a point between the Ath high-side switching element A_HS and the Ath low-side switching element A_LS.

The Bth power path B_P may connect the Bth point positioned in the Bth leg with the Bth phase of the steering motor. The Bth point positioned in the Bth leg may be a point between the Bth high-side switching element B_HS and the Bth low-side switching element B_LS.

The Cth power path C_P may connect the Cth point positioned in the Cth leg with the Cth phase of the steering motor. The Cth point positioned in the Cth leg may be a point between the Cth high-side switching element C_HS and the Cth low-side switching element C_LS.

The Ath power path controller 80-1 may be positioned on the Ath power path A_P and may include an Ath power path switching element 80-11 connecting or disconnecting the Ath power path A_P.

The Bth power path controller 80-2 may be positioned on the Bth power path B_P and may include a Bth power path switching element 80-21 connecting or disconnecting the Bth power path B_P.

The Cth power path controller 80-3 may be positioned on the Cth power path C_P and may include a Cth power path switching element 80-31 connecting or disconnecting the Cth power path C_P.

According to the present embodiments, the controller unit 50 may control the operation of the switching elements included in the inverter and the Ath power path switching element 80-11 to the Cth power path switching element 80-31 and determine the state of at least one power path switching element of the Ath power path switching element 80-11 to the Cth power path switching element 80-31 based on at least one phase voltage of the Ath phase voltage to the Cth phase voltage respectively formed at the Ath point to the Cth point positioned in the Ath leg to Cth leg of the inverter through the operation of the switching elements included in the inverter and the Ath power path switching element 80-11 to the Cth power path switching element 80-31.

The controller unit 50 may determine at least one mode of an initialization mode, a steering assist mode, or a diagnosis mode.

Upon determining that the mode is the initialization mode and the diagnosis mode, the controller unit 50 may control the operation of the inverter and the Ath power path controller 80-1 to the Cth power path controller 80-3 and determine the state of at least one power path controller of the Ath power path controller 80-1 to the Cth power path controller 80-3 based on at least one phase voltage of the Ath phase voltage to Cth phase voltage respectively formed at the Ath leg to Cth leg of the inverter through the operation of the inverter and the Ath power path controller 80-1 to the Cth power path controller 80-3, but without limitations thereto, the controller unit 50 may perform the above-described functions even upon determining that the mode is the steering assist mode.

The initialization mode may be a mode for testing the initialization for the steering assist device (e.g., an ECU). If ignition IGN switches to the on state, and the engine is in a stop state, the controller unit 50 may enter the initialization mode and may test the initialization state for the steering assist device (e.g., an ECU).

The steering assist mode may be a mode capable of assisting steering. Accordingly, if the engine switches to a run state in the ignition (IGN) on state, and the result of the initialization state test is normal, the controller unit 50 may enter the steering assist mode, assisting steering.

The diagnosis mode may be a mode for inspecting the state for the steering assist device (e.g., an ECU). If the engine switches to the stop state in the ignition (IGN) on state, the controller unit 50 may enter the diagnosis mode, inspecting the state for the steering assist device (e.g., an ECU).

Meanwhile, the controller unit 50 may determine the short state for at least one power path controller of the Ath power path controller 80-1 to the Cth power path controller 80-3 and then determine the open state.

In other words, the controller unit 50 may control the operation of the inverter and the Ath power path controller 80-1 to the Cth power path controller 80-3 and determine the short state for at least one power path controller of the Ath power path controller 80-1 to Cth power path controller 80-3 based on at least one phase voltage of the Ath phase voltage to Cth phase voltage respectively formed at the Ath leg to Cth leg of the inverter through the operation of the inverter and the Ath power path controller 80-1 to the Cth power path controller 80-3, and then determine the open state.

According to the present embodiments, the steering assist device may further include a voltage detection unit (not shown) capable of detecting at least one phase voltage of the Ath phase voltage to Cth phase voltage to thereby determine the state of at least one power path controller of the Ath power path controller 80-1 to the Cth power path controller 80-3 based on at least one phase voltage of the Ath phase voltage to Cth phase voltage detected by the voltage detection unit through the controller unit 50 but, without limitations thereto, the steering assist device may calculate the Ath phase voltage to Cth phase voltage using information (e.g., an electrical variable, e.g., current) obtained by the steering assist device and, based thereupon, determine the state of at least one power path controller of the Ath power path controller 80-1 to the Cth power path controller 80-3.

FIGS. 8, 9, 10, 11, 12, and 13 are views illustrating a method for determining the state of a power path controller according to the present embodiments.

Figure 8:
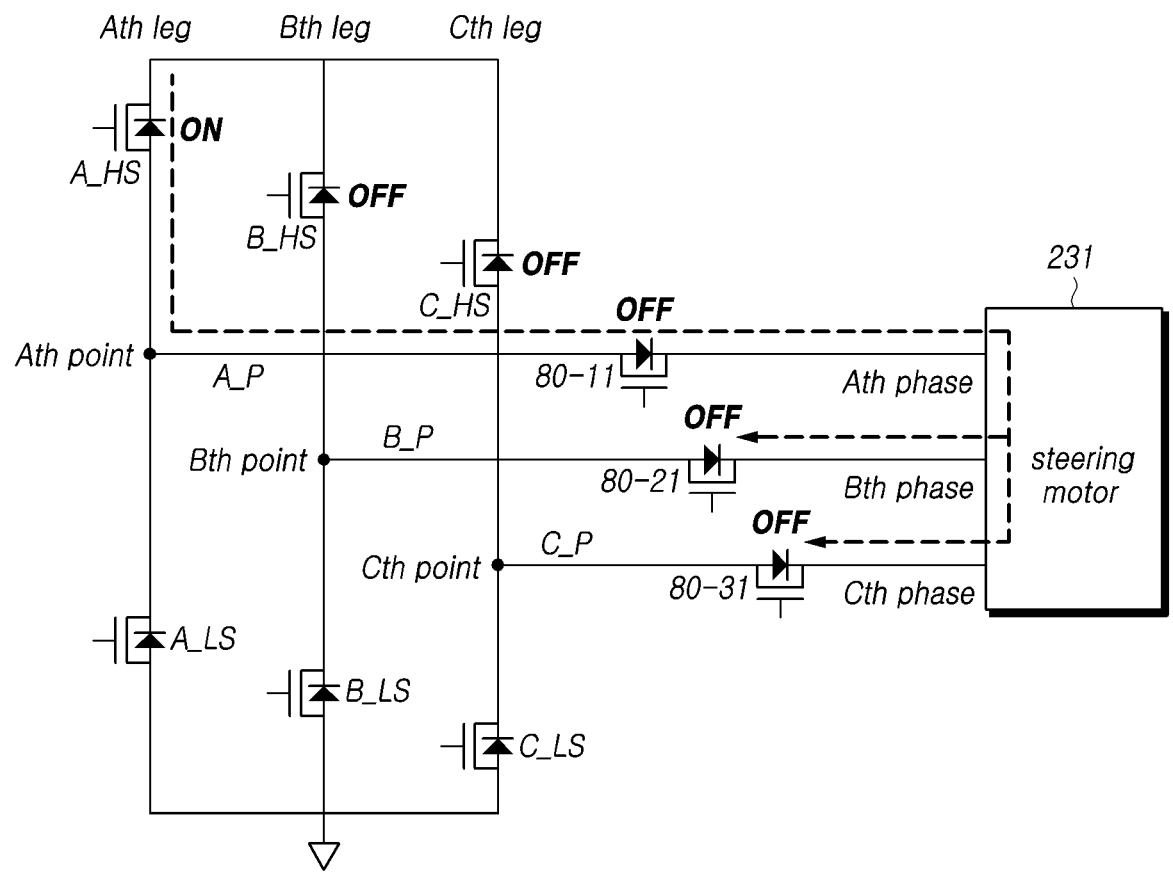
FIGS. 8, 9, 10, 11, 12, and 13 are views illustrating a method for determining the state of a power path controller according to the present embodiments.
Figure 9:
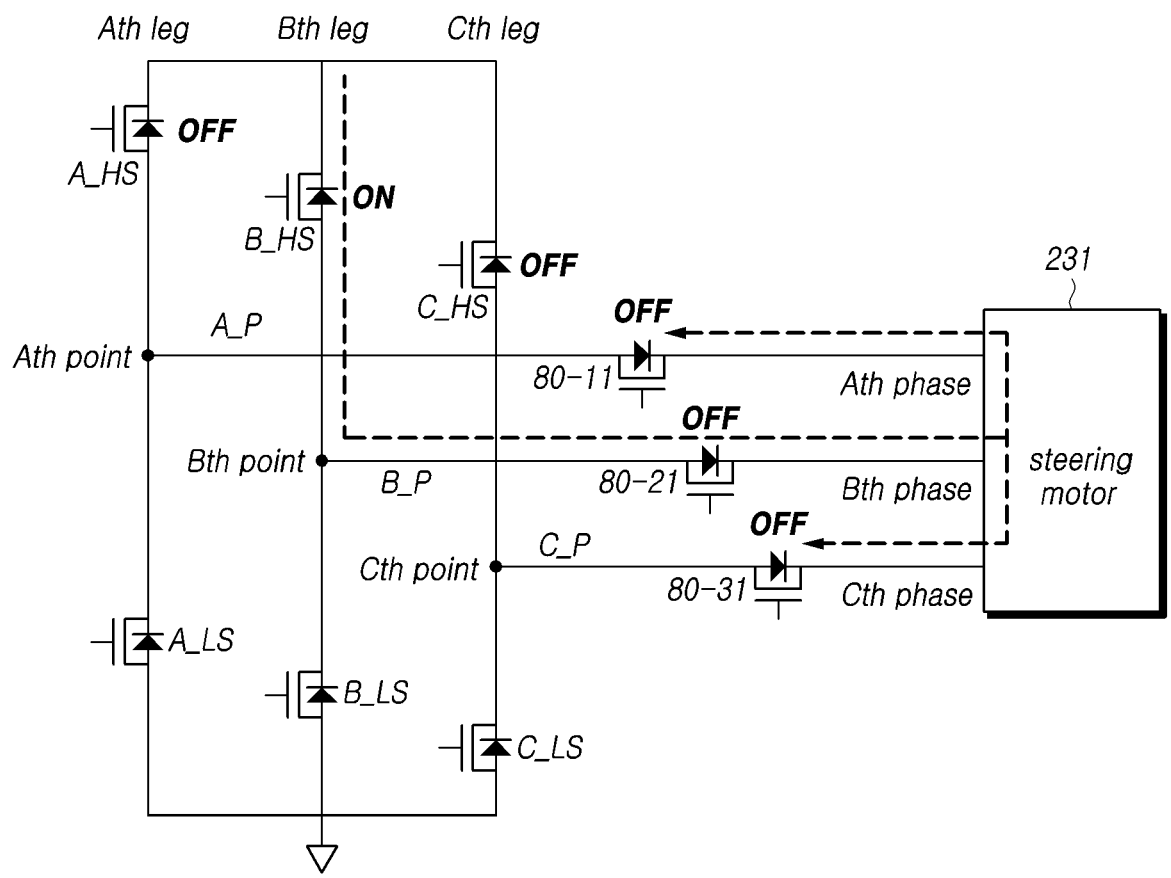
Figure 10:
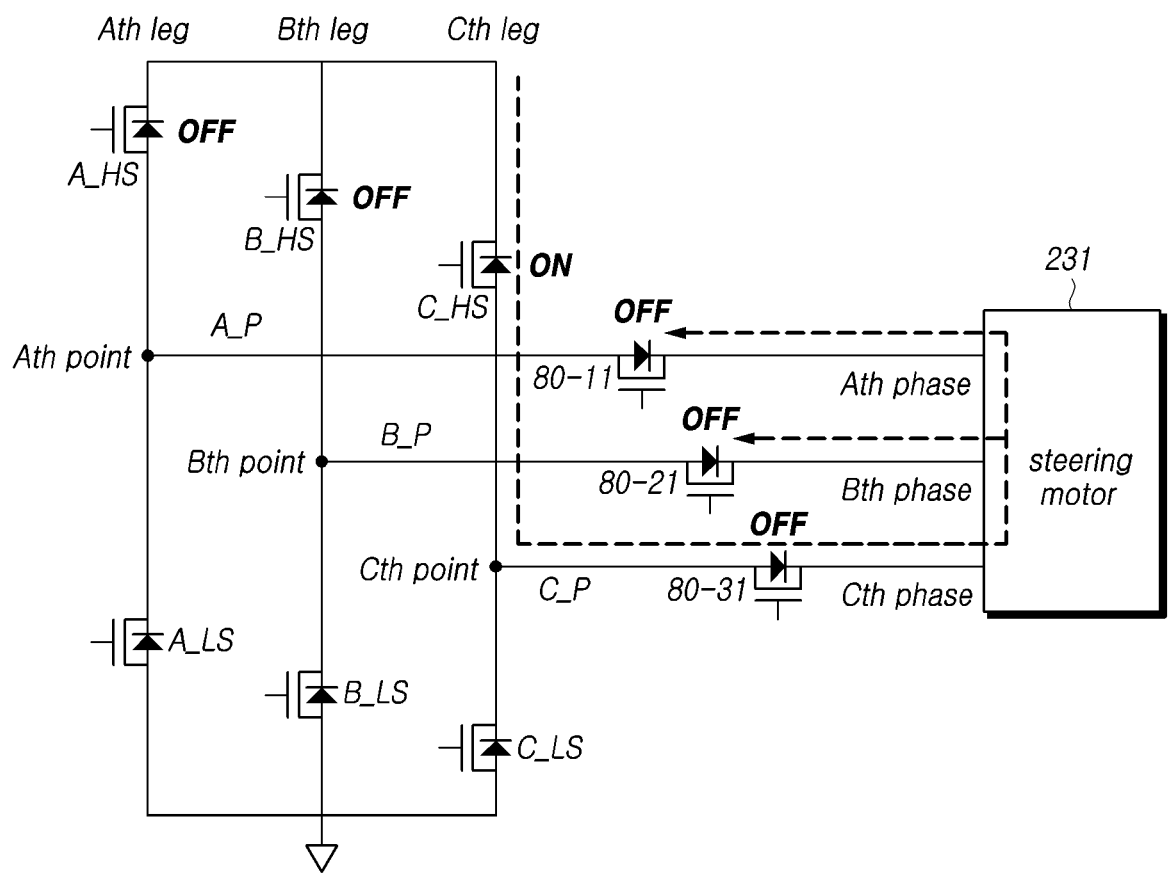

Referring to FIGS. 8 to 10, the controller unit 50 may control one high-side switching element of the Ath high-side switching element A_HS to Cth high-side switching element to turn on and may control the Ath power path switching element 80-11 to the Cth power path switching element 80-31 to turn off.

The controller unit 50 may control the two remaining high-side switching elements of the Ath high-side switching element A_HS to the Cth high-side switching element C_HS and the Ath low-side switching element A_LS to the Cth low-side switching element C_LS to turn off.

The controller unit 50 may compare at least one phase voltage of the Ath phase voltage to Cth phase voltage respectively formed at the Ath point to Cth point positioned in the Ath leg to Cth leg of the inverter with a preset normal phase voltage through the operation of the switching elements.

The controller unit 50 may determine the state of at least one power path switching element of the Ath power path switching element 80-11 to Cth power path switching element 80-31 according to the result of the comparison between at least one phase voltage of the Ath phase voltage to Cth phase voltage and the preset normal phase voltage.

The state of the power path switching element may include a short state and a normal state.

The preset normal phase voltage may be a reference voltage for determining whether the state of the Ath power path switching element 80-11 to Cth power path switching element 80-31 is the short state and the normal state and may include one or more values (or ranges). For example, if the preset normal phase voltage has one value (or range), the values for determining whether the states of the Ath power path switching element 80-11 to Cth power path switching element 80-31 are the short state and the normal state may be identical and, if the preset normal phase voltage has three values (or ranges), the values for determining whether the states of the Ath power path switching element 80-11 to Cth power path switching element 80-31 are the short state and the normal state may differ from each other.

Referring to FIG. 8, the controller unit 50 may control the Ath high-side switching element A_HS to turn on and control the Ath power path switching element 80-11 to Cth power path switching element 80-31 to turn off.

The controller unit 50 may control the Bth high-side switching element B_HS and the Cth high-side switching element C_HS, and the Ath low-side switching element A_LS to Cth low-side switching element C_LS to turn off.

The controller unit 50 may compare the Bth phase voltage and Cth phase voltage respectively formed at the Bth point and the Cth point positioned in the Bth leg and Cth leg of the inverter with the preset normal phase voltage through the operation of the switching elements and determine the state of the Bth power path switching element 80-21 and the Cth power path switching element 80-31 according to the result of the comparison.

As an example, if the Bth phase voltage is more than the preset normal phase voltage, the controller unit 50 may determine that the state of the Bth power path switching element 80-21 is the short state and, if the Bth phase voltage is the preset normal phase voltage or less, determine that the state of the Bth power path switching element 80-21 is the normal state.

As another example, if the Cth phase voltage is more than the preset normal phase voltage, the controller unit 50 may determine that the state of the Cth power path switching element 80-31 is the short state and, if the Cth phase voltage is the preset normal phase voltage or less, determine that the state of the Cth power path switching element 80-31 is the normal state.

Referring to FIG. 9, the controller unit 50 may control the Bth high-side switching element B_HS to turn on and control the Ath power path switching element 80-11 to Cth power path switching element 80-31 to turn off.

The controller unit 50 may control the Ath high-side switching element A_HS and the Cth high-side switching element C_HS, and the Ath low-side switching element A_LS to Cth low-side switching element C_LS to turn off.

The controller unit 50 may compare the Ath phase voltage and Cth phase voltage respectively formed at the Ath point and the Cth point positioned in the Ath leg and Cth leg of the inverter with the preset normal phase voltage through the operation of the switching elements and determine the state of the Ath power path switching element 80-11 and the Cth power path switching element 80-31 according to the result of the comparison.

As an example, if the Ath phase voltage is more than the preset normal phase voltage, the controller unit 50 may determine that the state of the Ath power path switching element 80-11 is the short state and, if the Ath phase voltage is the preset normal phase voltage or less, determine that the state of the Ath power path switching element 80-11 is the normal state.

As another example, if the Cth phase voltage is more than the preset normal phase voltage, the controller unit 50 may determine that the state of the Cth power path switching element 80-31 is the short state and, if the Cth phase voltage is the preset normal phase voltage or less, determine that the state of the Cth power path switching element 80-31 is the normal state.

Referring to FIG. 10, the controller unit 50 may control the Cth high-side switching element C_HS to turn on and control the Ath power path switching element 80-11 to Cth power path switching element 80-31 to turn off.

The controller unit 50 may control the Ath high-side switching element A_HS and the Bth high-side switching element B_HS, and the Ath low-side switching element A_LS to Cth low-side switching element C_LS to turn off.

The controller unit 50 may compare the Ath phase voltage and Bth phase voltage respectively formed at the Ath point and the Bth point positioned in the Ath leg and Bth leg of the inverter with the preset normal phase voltage through the operation of the switching elements and determine the state of the Ath power path switching element 80-11 and the Bth power path switching element 80-21 according to the result of the comparison.

As an example, if the Ath phase voltage is more than the preset normal phase voltage, the controller unit 50 may determine that the state of the Ath power path switching element 80-11 is the short state and, if the Ath phase voltage is the preset normal phase voltage or less, determine that the state of the Ath power path switching element 80-11 is the normal state.

As another example, if the Bth phase voltage is more than the preset normal phase voltage, the controller unit 50 may determine that the state of the Bth power path switching element 80-21 is the short state and, if the Bth phase voltage is the preset normal phase voltage or less, determine that the state of the Bth power path switching element 80-21 is the normal state.

As described above, according to the present embodiments, at the time of starting or completing the driving of the ECU, the steering assist device may turn off all of the PCO FETs, turn on only one of the high-side FETs of the inverter while turning off the other two, detect the phase voltages corresponding to the phases of the two FETs remaining off through, e.g., a circuit, such as a resistor voltage divider, determine that the PCO is short if the detected voltage value is high while determining that the PCO is normal if the detected voltage value is low, and repeat the above-described method on the other phases in the same way to thereby determine the state of all the PCO FETs, securing the safety of the power supply device of the steering motor without large current conductance and hence increasing reliability.

Figure 11:
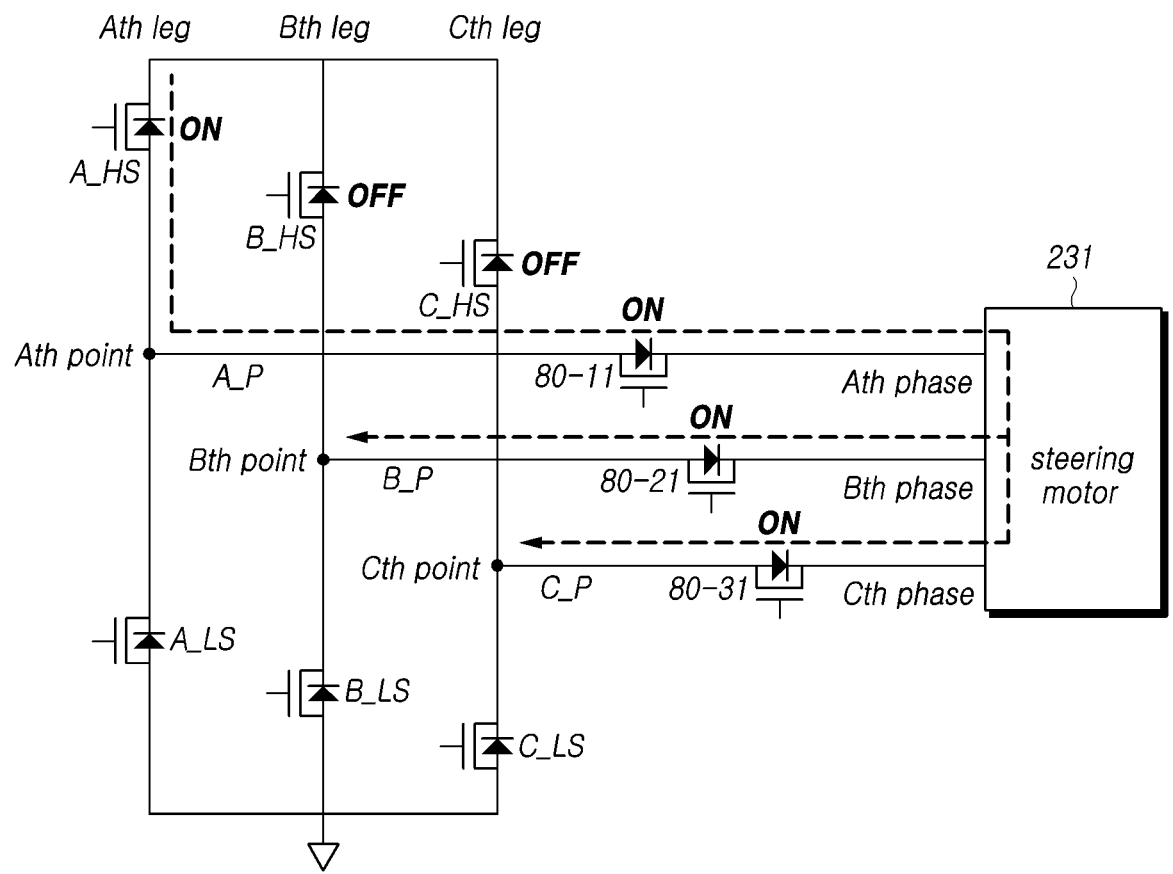
Figure 12:
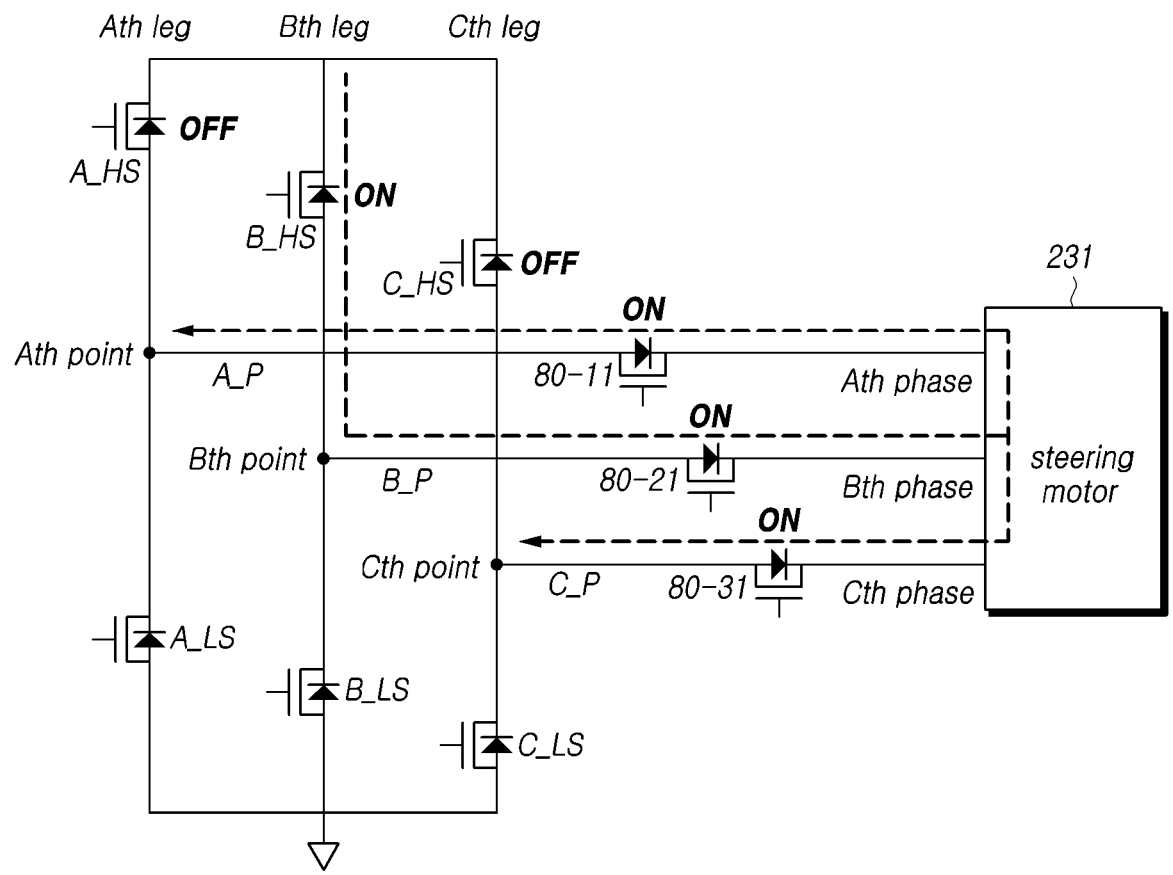
Figure 13:
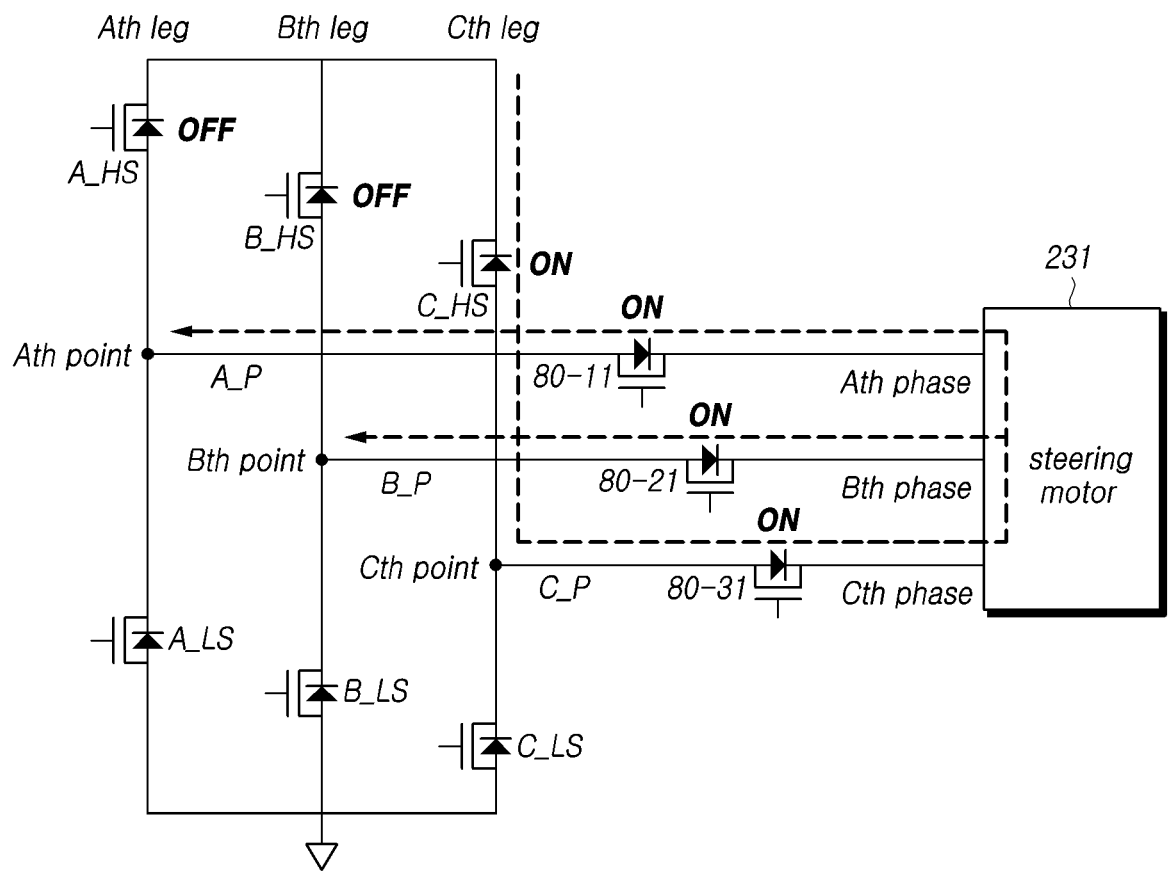

Referring to FIGS. 11 to 13, the controller unit 50 may control one high-side switching element of the Ath high-side switching element A_HS to Cth high-side switching element to turn on and may control the Ath power path switching element 80-11 to the Cth power path switching element 80-31 to turn on.

The controller unit 50 may control the two remaining high-side switching elements of the Ath high-side switching element A_HS to the Cth high-side switching element C_HS and the Ath low-side switching element A_LS to the Cth low-side switching element C_LS to turn off.

The controller unit 50 may compare at least one phase voltage of the Ath phase voltage to Cth phase voltage respectively formed at the Ath point to Cth point positioned in the Ath leg to Cth leg of the inverter with a preset normal phase voltage through the operation of the switching elements.

The controller unit 50 may determine the state of at least one power path switching element of the Ath power path switching element 80-11 to Cth power path switching element 80-31 according to the result of the comparison between at least one phase voltage of the Ath phase voltage to Cth phase voltage and the preset normal phase voltage.

The state of the power path switching element may include a short state and a normal state.

The preset normal phase voltage may be a reference voltage for determining whether the state of the Ath power path switching element 80-11 to Cth power path switching element 80-31 is the open state and the normal state and may include one or more values (or ranges). For example, if the preset normal phase voltage has one value (or range), the values for determining whether the states of the Ath power path switching element 80-11 to Cth power path switching element 80-31 are the open state and the normal state may be identical and, if the preset normal phase voltage has three values (or ranges), the values for determining whether the states of the Ath power path switching element 80-11 to Cth power path switching element 80-31 are the open state and the normal state may differ from each other.

Referring to FIG. 11, the controller unit 50 may control the Ath high-side switching element A_HS to turn on and control the Ath power path switching element 80-11 to Cth power path switching element 80-31 to turn on.

The controller unit 50 may control the Bth high-side switching element B_HS and the Cth high-side switching element C_HS, and the Ath low-side switching element A_LS to Cth low-side switching element C_LS to turn off.

The controller unit 50 may compare the Bth phase voltage and Cth phase voltage respectively formed at the Bth point and the Cth point positioned in the Bth leg and Cth leg of the inverter with the preset normal phase voltage through the operation of the switching elements and determine the state of the Bth power path switching element 80-21 and the Cth power path switching element 80-31 according to the result of the comparison.

As an example, if the Bth phase voltage is more than the preset normal phase voltage, the controller unit 50 may determine that the state of the Bth power path switching element 80-21 is the normal state and, if the Bth phase voltage is the preset normal phase voltage or less, determine that the state of the Bth power path switching element 80-21 is the open state.

As another example, if the Cth phase voltage is more than the preset normal phase voltage, the controller unit 50 may determine that the state of the Cth power path switching element 80-31 is the normal state and, if the Cth phase voltage is the preset normal phase voltage or less, determine that the state of the Cth power path switching element 80-31 is the open state.

Referring to FIG. 12, the controller unit 50 may control the Bth high-side switching element B_HS to turn on and control the Ath power path switching element 80-11 to Cth power path switching element 80-31 to turn on.

The controller unit 50 may control the Ath high-side switching element A_HS and the Cth high-side switching element C_HS, and the Ath low-side switching element A_LS to Cth low-side switching element C_LS to turn off.

The controller unit 50 may compare the Ath phase voltage and Cth phase voltage respectively formed at the Ath point and the Cth point positioned in the Ath leg and Cth leg of the inverter with the preset normal phase voltage through the operation of the switching elements and determine the state of the Ath power path switching element 80-11 and the Cth power path switching element 80-31 according to the result of the comparison.

As an example, if the Ath phase voltage is more than the preset normal phase voltage, the controller unit 50 may determine that the state of the Ath power path switching element 80-11 is the normal state and, if the Ath phase voltage is the preset normal phase voltage or less, determine that the state of the Ath power path switching element 80-11 is the open state.

As another example, if the Cth phase voltage is more than the preset normal phase voltage, the controller unit 50 may determine that the state of the Cth power path switching element 80-31 is the normal state and, if the Cth phase voltage is the preset normal phase voltage or less, determine that the state of the Cth power path switching element 80-31 is the open state.

Referring to FIG. 13, the controller unit 50 may control the Cth high-side switching element C_HS to turn on and control the Ath power path switching element 80-11 to Cth power path switching element 80-31 to turn on.

The controller unit 50 may control the Ath high-side switching element A_HS and the Bth high-side switching element B_HS, and the Ath low-side switching element A_LS to Cth low-side switching element C_LS to turn off.

The controller unit 50 may compare the Ath phase voltage and Bth phase voltage respectively formed at the Ath point and the Bth point positioned in the Ath leg and Bth leg of the inverter with the preset normal phase voltage through the operation of the switching elements and determine the state of the Ath power path switching element 80-11 and the Bth power path switching element 80-21 according to the result of the comparison.

As an example, if the Ath phase voltage is more than the preset normal phase voltage, the controller unit 50 may determine that the state of the Ath power path switching element 80-11 is the normal state and, if the Ath phase voltage is the preset normal phase voltage or less, determine that the state of the Ath power path switching element 80-11 is the open state.

As another example, if the Bth phase voltage is more than the preset normal phase voltage, the controller unit 50 may determine that the state of the Bth power path switching element 80-21 is the normal state and, if the Bth phase voltage is the preset normal phase voltage or less, determine that the state of the Bth power path switching element 80-21 is the open state.

As described above, according to the present embodiments, at the time of starting or completing the driving of the ECU, the steering assist device may turn on all of the PCO FETs, turn on only one of the high-side FETs of the inverter while turning off the other two, detect the phase voltages corresponding to the phases of the two FETs remaining off through, e.g., a circuit, such as a resistor voltage divider, determine that the PCO is normal if the detected voltage value is high while determining that the PCO is open if the detected voltage value is low, and repeat the above-described method on the other phases in the same way to thereby determine the state of all the PCO FETs, securing the safety of the power supply device of the steering motor without large current conductance and hence increasing reliability.

Further, according to the present embodiments, the steering assist device may determine the PCO FET state. Upon determining the state of the PCO FET, the steering assist device may determine the open state after determining the short state for the PCO FET, determining all of the states for the PCO FET, i.e., the short state, open state, and normal state and preventing secondary burnout of the FET of the inverter due to large current conductance through (or via) the already shorted, burned-out PCO FET. Thus, according to the present embodiments, the steering assist device may secure the safety of the power supply device of the steering motor without large current conductance, increasing reliability.

Referring to FIGS. 7 to 13, according to the present embodiments, the Ath high-side switching element A_HS to the Cth high-side switching element C_HS, the Ath low-side switching element A_LS to the Cth low-side switching element C_LS, and the Ath power path switching element 80-11 to the Cth power path switching element 80-31 may include a field effect transistor (FET) but, without limitations thereto, may include any element that may connect or disconnect the path where each is positioned.

A steering assist method according to the present embodiments is described below with reference to the accompanying drawings. What overlaps the steering system and steering assist device described above in connection with FIGS. 1 to 13 according to the present embodiments is omitted from further description for brevity of description.

Figure 14:
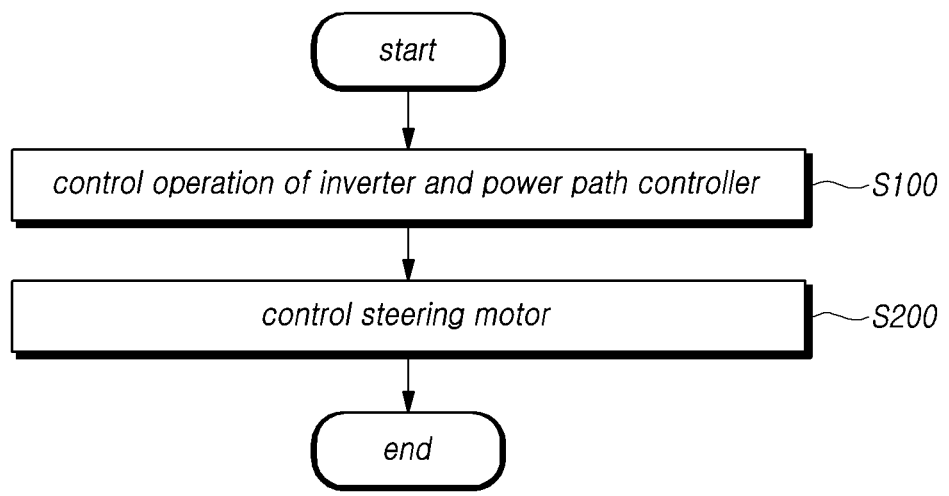
FIG. 14 is a flowchart illustrating a steering assist method according to the present embodiments.

FIG. 14 is a flowchart illustrating a steering assist method according to the present embodiments.

Referring to FIG. 14, according to the present embodiments, a steering assist method may include at least one of the step S100 of controlling the operation of the inverter and the power path controller or the step S200 of controlling the steering motor.

First, the operation of the inverter and the power path controller may be controlled (S100).

In other words, in step S100, the operation of the inverter and the Ath power path controller to Cth power path controller may be controlled.

Thereafter, the steering motor may be controlled (S200).

In other words, step S200 may determine the state of at least one power path controller of the Ath power path controller to the Cth power path controller based on at least one phase voltage of the Ath phase voltage to the Cth phase voltage respectively formed at the Ath leg to Cth leg of the inverter through the operation of the inverter and the Ath power path controller to the Cth power path controller and control the steering motor (or steering assist) according to a result of the determination of the state of at least one power path controller.

Step S200 may determine at least one mode of the initialization mode, the steering assist mode, or the diagnosis mode and, if the mode is determined to be the initialization mode and the diagnosis mode, control the operation of the inverter and the Ath power path controller to Cth power path controller, and determine the state of at least one power path controller of the Ath power path controller to the Cth power path controller based on at least one phase voltage of the Ath phase voltage to Cth phase voltage respectively formed at the Ath leg to Cth leg of the inverter through the operation of the inverter and the Ath power path controller to the Cth power path controller.

Meanwhile, step S200 may determine the short state for at least one power path controller of the Ath power path controller to the Cth power path controller and then determine the open state.

In other words, step S200 may control the operation of the inverter and the Ath power path controller to the Cth power path controller and determine the short state for at least one power path controller of the Ath power path controller to Cth power path controller based on at least one phase voltage of the Ath phase voltage to Cth phase voltage respectively formed at the Ath leg to Cth leg of the inverter through the operation of the inverter and the Ath power path controller to the Cth power path controller, and then determine the open state.

Meanwhile, step S200 may control one high-side switching element of the Ath high-side switching element to Cth high-side switching element to turn on and may control the Ath power path switching element to the Cth power path switching element to turn off.

Then, step S200 may compare at least one phase voltage of the Ath phase voltage to Cth phase voltage respectively formed at the Ath point to Cth point positioned in the Ath leg to Cth leg of the inverter with a preset normal phase voltage through the operation of the switching elements.

Then, step S200 may determine the state of at least one power path switching element of the Ath power path switching element to Cth power path switching element according to the result of the comparison between at least one phase voltage of the Ath phase voltage to Cth phase voltage and the preset normal phase voltage.

Meanwhile, step S200 may control the Ath high-side switching element to turn on and may control the Ath power path switching element to the Cth power path switching element to turn off.

Then, step S200 may compare the Bth phase voltage and Cth phase voltage respectively formed at the Bth point and the Cth point positioned in the Bth leg and Cth leg of the inverter with the preset normal phase voltage through the operation of the switching elements and determine the state of the Bth power path switching element and the Cth power path switching element according to the result of the comparison.

As an example, if the Bth phase voltage is more than the preset normal phase voltage, step S200 may determine that the state of the Bth power path switching element is the short state and, if the Bth phase voltage is the preset normal phase voltage or less, determine that the state of the Bth power path switching element is the normal state.

As another example, if the Cth phase voltage is more than the preset normal phase voltage, step S200 may determine that the state of the Cth power path switching element is the short state and, if the Cth phase voltage is the preset normal phase voltage or less, determine that the state of the Cth power path switching element is the normal state.

Meanwhile, step S200 may control the Bth high-side switching element to turn on and may control the Ath power path switching element to the Cth power path switching element to turn off.

Then, step S200 may compare the Ath phase voltage and Cth phase voltage respectively formed at the Ath point and the Cth point positioned in the Ath leg and Cth leg of the inverter with the preset normal phase voltage through the operation of the switching elements and determine the state of the Ath power path switching element and the Cth power path switching element according to the result of the comparison.

As an example, if the Ath phase voltage is more than the preset normal phase voltage, step S200 may determine that the state of the Ath power path switching element is the short state and, if the Ath phase voltage is the preset normal phase voltage or less, determine that the state of the Ath power path switching element is the normal state.

As another example, if the Cth phase voltage is more than the preset normal phase voltage, step S200 may determine that the state of the Cth power path switching element is the short state and, if the Cth phase voltage is the preset normal phase voltage or less, determine that the state of the Cth power path switching element is the normal state.

Meanwhile, step S200 may control the Cth high-side switching element to turn on and may control the Ath power path switching element to the Cth power path switching element to turn off.

Then, step S200 may compare the Ath phase voltage and Bth phase voltage respectively formed at the Ath point and the Bth point positioned in the Ath leg and Bth leg of the inverter with the preset normal phase voltage through the operation of the switching elements and determine the state of the Ath power path switching element and the Bth power path switching element according to the result of the comparison.

As an example, if the Ath phase voltage is more than the preset normal phase voltage, step S200 may determine that the state of the Ath power path switching element is the short state and, if the Ath phase voltage is the preset normal phase voltage or less, determine that the state of the Ath power path switching element is the normal state.

As another example, if the Bth phase voltage is more than the preset normal phase voltage, step S200 may determine that the state of the Bth power path switching element is the short state and, if the Bth phase voltage is the preset normal phase voltage or less, determine that the state of the Bth power path switching element is the normal state.

Meanwhile, step S200 may control one high-side switching element of the Ath high-side switching element to Cth high-side switching element to turn on and may control the Ath power path switching element to the Cth power path switching element to turn on.

Then, step S200 may compare at least one phase voltage of the Ath phase voltage to Cth phase voltage respectively formed at the Ath point to Cth point positioned in the Ath leg to Cth leg of the inverter with a preset normal phase voltage through the operation of the switching elements.

Then, step S200 may determine the state of at least one power path switching element of the Ath power path switching element to Cth power path switching element according to the result of the comparison between at least one phase voltage of the Ath phase voltage to Cth phase voltage and the preset normal phase voltage.

Meanwhile, step S200 may control the Ath high-side switching element to turn on and may control the Ath power path switching element to the Cth power path switching element to turn on.

Then, step S200 may compare the Bth phase voltage and Cth phase voltage respectively formed at the Bth point and the Cth point positioned in the Bth leg and Cth leg of the inverter with the preset normal phase voltage through the operation of the switching elements and determine the state of the Bth power path switching element and the Cth power path switching element according to the result of the comparison.

As an example, if the Bth phase voltage is more than the preset normal phase voltage, step S200 may determine that the state of the Bth power path switching element is the normal state and, if the Bth phase voltage is the preset normal phase voltage or less, determine that the state of the Bth power path switching element is the open state.

As another example, if the Cth phase voltage is more than the preset normal phase voltage, step S200 may determine that the state of the Cth power path switching element is the normal state and, if the Cth phase voltage is the preset normal phase voltage or less, determine that the state of the Cth power path switching element is the open state.

Meanwhile, step S200 may control the Bth high-side switching element to turn on and may control the Ath power path switching element to the Cth power path switching element to turn on.

Then, step S200 may compare the Ath phase voltage and Cth phase voltage respectively formed at the Ath point and the Cth point positioned in the Ath leg and Cth leg of the inverter with the preset normal phase voltage through the operation of the switching elements and determine the state of the Ath power path switching element and the Cth power path switching element according to the result of the comparison.

As an example, if the Ath phase voltage is more than the preset normal phase voltage, step S200 may determine that the state of the Ath power path switching element is the normal state and, if the Ath phase voltage is the preset normal phase voltage or less, determine that the state of the Ath power path switching element is the open state.

As another example, if the Cth phase voltage is more than the preset normal phase voltage, step S200 may determine that the state of the Cth power path switching element is the normal state and, if the Cth phase voltage is the preset normal phase voltage or less, determine that the state of the Cth power path switching element is the open state.

Meanwhile, step S200 may control the Cth high-side switching element to turn on and may control the Ath power path switching element to the Cth power path switching element to turn on.

Then, step S200 may compare the Ath phase voltage and Bth phase voltage respectively formed at the Ath point and the Bth point positioned in the Ath leg and Bth leg of the inverter with the preset normal phase voltage through the operation of the switching elements and determine the state of the Ath power path switching element and the Bth power path switching element according to the result of the comparison.

As an example, if the Ath phase voltage is more than the preset normal phase voltage, step S200 may determine that the state of the Ath power path switching element is the normal state and, if the Ath phase voltage is the preset normal phase voltage or less, determine that the state of the Ath power path switching element is the open state.

As another example, if the Bth phase voltage is more than the preset normal phase voltage, step S200 may determine that the state of the Bth power path switching element is the normal state and, if the Bth phase voltage is the preset normal phase voltage or less, determine that the state of the Bth power path switching element is the open state.

Figure 15:
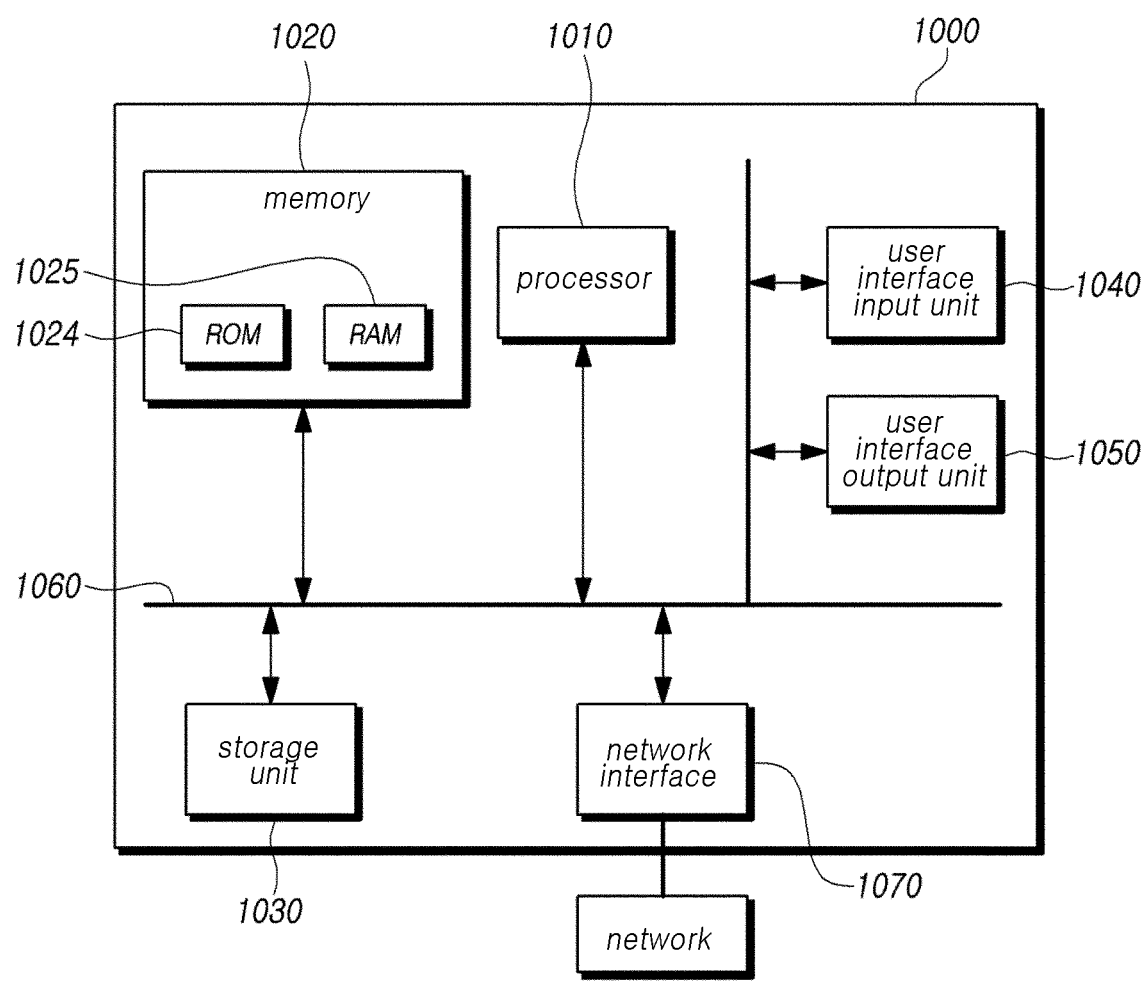
FIG. 15 is a block diagram illustrating a configuration of a computer system for a steering control device, a steering assist device, and a steering system according to the present embodiments.

FIG. 15 is a block diagram illustrating a configuration of a computer system for a steering control device (or steering control module), a steering assist device, and a steering system according to the present embodiments.

Referring to FIG. 15, the above-described embodiments may be implemented as, e.g., a computer-readable recording medium, in a computer system. As illustrated in the drawings, the computer system 1000 of the steering control device (or steering control module), steering assist device, and steering system may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to the present embodiments of the disclosure. In particular, if the at least one core includes a plurality of cores, at least one of the plurality of cores may include a lockstep core.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering assist device, comprising:
an Ath power path controller, a Bth power path controller, and a Cth power path controller, each of which is configured to supply, or cut off supply of, an assist steering force generated through an inverter, to a steering motor, wherein
the Ath power path controller is positioned on an Ath power path connecting an Ath leg of the inverter with an Ath phase of the steering motor the Ath power path controller including an Ath power path switching element configured to connect or disconnect the Ath power path,
the Bth power path controller is positioned on a Bth power path connecting a Bth leg of the inverter with a Bth phase of the steering motor, the Bth power path controller including a Bth power path switching element configured to connect or disconnect the Bth power path, and
the Cth power path controller is positioned on a Cth power path connecting a Cth leg of the inverter with a Cth phase of the steering motor, the Cth power path controller including a Cth power path switching element configured to connect or disconnect the Cth power path; and
a controller unit
controlling an operation of the inverter and the Ath power path controller, the Bth power path controller, and the Cth power path controller,
performing a state determination of at least one of the Ath power path controller, the Bth power path controller, and the Cth power path controller based on at least one of an Ath phase voltage, a Bth phase voltage, and a Cth phase voltage respectively formed at the Ath leg, the Bth leg, and the Cth leg of the inverter through the operation, and
controlling the steering motor according to a result of the state determination,
wherein the controller unit is capable of operating on at least three different modes which are an initialization mode, a steering assist mode, and a diagnosis mode, wherein
the initialization mode is a mode which the controller unit enters when an ignition switches to an on state while an engine remains in a stop state,
the diagnosis mode is a mode which the controller unit enters when a state of the engine and the ignition is changed from a first state in which the engine is in a run state and the ignition is in the on state to a second state in which the engine switches from the run state to the stop state while the ignition remains in the on state, and the steering assist mode is a mode capable of assisting steering, wherein the controller unit enters the steering assist mode when the engine switches from the stop state to the run state while the ignition remains in the on state and a result of an initialization state test performed in the initialization mode is determined to be normal, wherein the controller unit is configured to perform the state determination of at least one of the Ath power path controller, the Bth power path controller, and the Cth power path controller in at least two cases, which are a first case when the controller unit enters the initialization mode and a second case when the controller unit enters the diagnosis mode.

2. The steering assist device of claim 1, further comprising the inverter including the Ath leg including an Ath high-side switching element and an Ath low-side switching element connected in series with each other, the Bth leg including a Bth high-side switching element and a Bth low-side switching element connected in series with each other, and the Cth leg including a Cth high-side switching element and a Cth low-side switching element connected in series with each other.

3. The steering assist device of claim 2, further comprising a power path unit including the Ath power path connecting an Ath point positioned in the Ath leg between the Ath high-side switching element and the Ath low-side switching element with the Ath phase of the steering motor, the Bth power path connecting a Bth point positioned in the Bth leg between the Bth high-side switching element and the Bth low-side switching element with the Bth phase of the steering motor, and the Cth power path connecting a Cth point positioned in the Cth leg between the Cth high-side switching element and the Cth low-side switching element with the Cth phase of the steering motor.

4. The steering assist device of claim 3, wherein the controller unit controls one of the Ath high-side switching element to Cth high-side switching element to turn on and controls the Ath power path switching element, the Bth power path switching element, and the Cth power path switching element to turn off.

5. The steering assist device of claim 4, wherein the controller unit compares at least one of the Ath phase voltage, the Bth phase voltage, and the Cth phase voltage respectively formed at the Ath point, the Bth point, and the Cth point positioned in the Ath leg, the Bth leg, and the Cth leg of the inverter with a preset normal phase voltage and determines a state of at least one of the Ath power path switching element, the Bth power path switching element, and the Cth power path switching element according to a result of the comparison.

6. The steering assist device of claim 5, wherein the controller unit compares the Bth phase voltage and the Cth phase voltage with the preset normal phase voltage if controlling the Ath high-side switching element to turn on while controlling the Ath power path switching element, the Bth power path switching element, and the Cth power path switching element to turn off and determines a state of the Bth power path switching element and the Cth power path switching element according to a result of the comparison, wherein the controller unit determines that the state of the Bth power path switching element is a short state if the Bth phase voltage is more than the preset normal phase voltage and determines that the state of the Bth power path switching element is a normal state if the Bth phase voltage is the preset normal phase voltage or less, and wherein the controller unit determines that the state of the Cth power path switching element is the short state if the Cth phase voltage is more than the preset normal phase voltage and determines that the state of the Cth power path switching element is the normal state if the Cth phase voltage is the preset normal phase voltage or less.

7. The steering assist device of claim 5, wherein the controller unit compares the Ath phase voltage and the Cth phase voltage with the preset normal phase voltage if controlling the Bth high-side switching element to turn on while controlling the Ath power path switching element, the Bth power path switching element, and the Cth power path switching element to turn off and determines a state of the Ath power path switching element and the Cth power path switching element according to a result of the comparison, wherein the controller unit determines that the state of the Ath power path switching element is a short state if the Ath phase voltage is more than the preset normal phase voltage and determines that the state of the Ath power path switching element is a normal state if the Ath phase voltage is the preset normal phase voltage or less, and wherein the controller unit determines that the state of the Cth power path switching element is the short state if the Cth phase voltage is more than the preset normal phase voltage and determines that the state of the Cth power path switching element is the normal state if the Cth phase voltage is the preset normal phase voltage or less.

8. The steering assist device of claim 5, wherein the controller unit compares the Ath phase voltage and the Bth phase voltage with the preset normal phase voltage if controlling the Cth high-side switching element to turn on while controlling the Ath power path switching element, the Bth power path switching element, and the Cth power path switching element to turn off and determines a state of the Ath power path switching element and the Bth power path switching element according to a result of the comparison, wherein the controller unit determines that the state of the Ath power path switching element is a short state if the Ath phase voltage is more than the preset normal phase voltage and determines that the state of the Ath power path switching element is a normal state if the Ath phase voltage is the preset normal phase voltage or less, and wherein the controller unit determines that the state of the Bth power path switching element is the short state if the Bth phase voltage is more than the preset normal phase voltage and determines that the state of the Bth power path switching element is the normal state if the Bth phase voltage is the preset normal phase voltage or less.

9. The steering assist device of claim 3, wherein the controller unit controls one of the Ath high-side switching element, the Bth high-side switching element, and the Cth high-side switching element to turn on and controls the Ath power path switching element, the Bth power path switching element, and the Cth power path switching element to turn on.

10. The steering assist device of claim 9, wherein the controller unit compares at least one of the Ath phase voltage, the Bth phase voltage, and the Cth phase voltage respectively formed at the Ath point, the Bth point, and the Cth point positioned in the Ath leg, the Bth leg, and the Cth leg of the inverter with a preset normal phase voltage and determines a state of at least one of the Ath power path switching element, the Bth power path switching element, and the Cth power path switching element according to a result of the comparison.

11. The steering assist device of claim 10, wherein the controller unit compares the Bth phase voltage and the Cth phase voltage with the preset normal phase voltage if controlling the Ath high-side switching element to turn on while controlling the Ath power path switching element, the Bth power path switching element, and the Cth power path switching element to turn on and determines a state of the Bth power path switching element and the Cth power path switching element according to a result of the comparison, wherein the controller unit determines that the state of the Bth power path switching element is a normal state if the Bth phase voltage is more than the preset normal phase voltage and determines that the state of the Bth power path switching element is an open state if the Bth phase voltage is the preset normal phase voltage or less, and wherein the controller unit determines that the state of the Cth power path switching element is the normal state if the Cth phase voltage is more than the preset normal phase voltage and determines that the state of the Cth power path switching element is the open state if the Cth phase voltage is the preset normal phase voltage or less.

12. The steering assist device of claim 10, wherein the controller unit compares the Ath phase voltage and the Cth phase voltage with the preset normal phase voltage if controlling the Bth high-side switching element to turn on while controlling the Ath power path switching element, the Bth power path switching element, and the Cth power path switching element to turn on and determines a state of the Ath power path switching element and the Cth power path switching element according to a result of the comparison, wherein the controller unit determines that the state of the Ath power path switching element is a normal state if the Ath phase voltage is more than the preset normal phase voltage and determines that the state of the Ath power path switching element is an open state if the Ath phase voltage is the preset normal phase voltage or less, and wherein the controller unit determines that the state of the Cth power path switching element is the normal state if the Cth phase voltage is more than the preset normal phase voltage and determines that the state of the Cth power path switching element is the open state if the Cth phase voltage is the preset normal phase voltage or less.

13. The steering assist device of claim 10, wherein the controller unit compares the Ath phase voltage and the Bth phase voltage with the preset normal phase voltage if controlling the Cth high-side switching element to turn on while controlling the Ath power path switching element, the Bth power path switching element, and the Cth power path switching element to turn on and determines a state of the Ath power path switching element and the Bth power path switching element according to a result of the comparison, wherein the controller unit determines that the state of the Ath power path switching element is a normal state if the Ath phase voltage is more than the preset normal phase voltage and determines that the state of the Ath power path switching element is an open state if the Ath phase voltage is the preset normal phase voltage or less, and wherein the controller unit determines that the state of the Bth power path switching element is the normal state if the Bth phase voltage is more than the preset normal phase voltage and determines that the state of the Bth power path switching element is the open state if the Bth phase voltage is the preset normal phase voltage or less.

14. The steering assist device of claim 1, wherein the controller unit controls the operation of the inverter and the Ath power path controller, the Bth power path controller, and the Cth power path controller if the mode is determined to be the initialization mode and the diagnosis mode and determines the state of at least one of the Ath power path controller, and the Bth power path controller, and the Cth power path controller based on at least one of the Ath phase voltage, the Bth phase voltage, and the Cth phase voltage formed therethrough.

15. The steering assist device of claim 1, wherein the controller unit determines an open state after determining a short state for at least one of the Ath power path controller, the Bth power path controller, and the Cth power path controller.

16. The steering assist device of claim 1, wherein each of the Ath power path switching element, the Bth power path switching element, and the Cth power path switching element comprises a field effect transistor (FET).

* * * * *